United States Patent
Li

(10) Patent No.: US 12,455,345 B2
(45) Date of Patent: Oct. 28, 2025

(54) RADAR SYSTEM, AND SIGNAL PROCESSING METHOD AND APPARATUS

(71) Applicant: SHENZHEN YINWANG INTELLIGENT TECHNOLOGIES CO., LTD., Shenzhen (CN)

(72) Inventor: Qiang Li, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 455 days.

(21) Appl. No.: 17/943,898

(22) Filed: Sep. 13, 2022

(65) Prior Publication Data

US 2023/0003833 A1 Jan. 5, 2023

Related U.S. Application Data

(63) Continuation of application No. PCT/CN2020/079236, filed on Mar. 13, 2020.

(51) Int. Cl.
*G01S 7/295* (2006.01)
*G01S 7/02* (2006.01)
*G01S 7/292* (2006.01)

(52) U.S. Cl.
CPC ............ *G01S 7/295* (2013.01); *G01S 7/0232* (2021.05); *G01S 7/0235* (2021.05); *G01S 7/2921* (2013.01); *G01S 7/2923* (2013.01)

(58) Field of Classification Search
CPC ...... G01S 7/295; G01S 7/0235; G01S 7/0232; G01S 7/2921; G01S 7/2923
USPC ......................................................... 342/195
See application file for complete search history.

(56) References Cited

U.S. PATENT DOCUMENTS

| | | | |
|---|---|---|---|
| 2007/0182528 A1 | 8/2007 | Breed et al. | |
| 2015/0109605 A1* | 4/2015 | Major, Jr. ............. | G01S 7/4868 356/28 |
| 2018/0031680 A1 | 2/2018 | Lee et al. | |

(Continued)

FOREIGN PATENT DOCUMENTS

| | | | | |
|---|---|---|---|---|
| CN | 101303507 A | 11/2008 | | |
| CN | 101303507 B | * 4/2011 | ............. | G01S 17/08 |
| CN | 104122542 A | 10/2014 | | |

(Continued)

OTHER PUBLICATIONS

Vig. "Quartz Crystal Resonators and Oscillators for Frequency Control and Timing Applications—A Tutorial" Rev. 8.5.1.2, by John R. Vig, Jul. 2001, AD-M001251. (Year: 2001).*

(Continued)

*Primary Examiner* — William Kelleher
*Assistant Examiner* — Samarina Makhdoom
(74) *Attorney, Agent, or Firm* — Fish & Richardson P.C.

(57) ABSTRACT

Embodiments of this application provide a radar system, and a signal processing method and apparatus. The radar system includes: a transmitting assembly, a receiving assembly, and a controller. The transmitting assembly is configured to generate and transmit N first signals, where characteristics of the N first signals are different, the characteristic includes a wavelength and/or a delay, and N is an integer greater than 1; the receiving assembly is configured to receive a second signal; and the controller is configured to determine, based on the characteristics of the N first signals, whether the second signal includes an echo signal corresponding to the first signal.

21 Claims, 18 Drawing Sheets

(56) References Cited

U.S. PATENT DOCUMENTS

2018/0188371 A1* 7/2018 Bao .................. G01S 17/87
2018/0284277 A1 10/2018 Lachapelle et al.

FOREIGN PATENT DOCUMENTS

| CN | 105589506 A | 5/2016 | | |
|---|---|---|---|---|
| CN | 107565361 A | 1/2018 | | |
| CN | 108519218 A | 9/2018 | | |
| CN | 108828607 A | 11/2018 | | |
| CN | 109541627 A | 3/2019 | | |
| CN | 109597090 A | * 4/2019 | ............ | G01S 17/08 |
| CN | 109799196 A | 5/2019 | | |
| CN | 110058252 A | 7/2019 | | |
| CN | 110174664 A | 8/2019 | | |

OTHER PUBLICATIONS

Herbert. "Modelling of phase noise from frequency references in bistatic radar," IMA Conference on Mathematics in Defence 2015 (Year: 2015).*

Vig. "Quartz Crystal Resonators and Oscillators For Frequency Control and Timing Applications—A Tutorial," SLCET-TR-88-1 (Rev. 8.5.2.2) AD-M001251, 2004 (Year: 2004).*

Office Action in Chinese Appln. No. 202080004820.1, dated Aug. 18, 2021, 17 pages (with English translation).

Extended European Search Report in European Appln No. 20924750. 1, dated Mar. 17, 2023, 16 pages.

International Search Report and Written Opinion in International Appln. No. PCT/CN2020/079236, mailed on Dec. 11, 2020, 15 pages (with English translation).

* cited by examiner

RADAR SYSTEM, AND SIGNAL PROCESSING METHOD AND APPARATUS

CROSS-REFERENCE TO RELATED APPLICATIONS

This application is a continuation of International Application No. PCT/CN2020/079236, filed on Mar. 13, 2020, the disclosure of which is hereby incorporated by reference in its entirety.

TECHNICAL FIELD

This application relates to the field of communication technologies, and in particular, to a radar system, and a signal processing method and apparatus.

BACKGROUND

A radar system may perform measurement (for example, speed measurement, distance measurement, and positioning) on an object (for example, a vehicle or a pedestrian), and the radar system is widely applied in many fields (for example, the unmanned driving field and the intelligent transportation field).

In an actual application process, the radar system sends a transmit signal to surroundings. After the transmit signal reaches an obstacle (the object), the obstacle reflects the transmit signal, so that the radar system can receive a reflected signal. The radar system can measure the object based on the transmit signal and the reflected signal. However, in the actual application process, the radar system may receive many interference signals. For example, the interference signals include a signal transmitted by another radar system, a signal maliciously attacked by a hacker, and an environmental interference signal. Because characteristics of many interference signals of a radar are very similar to those of a real reflected signal, the radar system cannot accurately distinguish between the reflected signal and the interference signal, and cannot accurately measure the object.

SUMMARY

Embodiments of this application provide a radar system, and a signal processing method and apparatus. This improves measurement accuracy of the radar system on an object.

According to a first aspect, an embodiment of this application provides a radar system, including a transmitting assembly, a receiving assembly, and a controller. The transmitting assembly is configured to generate and transmit N first signals, where characteristics of the N first signals are different, the characteristic includes a wavelength and/or a delay, and N is an integer greater than 1. The receiving assembly is configured to receive a second signal. The controller is configured to determine, based on the characteristics of the N first signals, whether the second signal includes an echo signal corresponding to the first signal.

In the foregoing process, a transmit signal transmitted by the transmitting assembly includes N (N is an integer greater than 1) first signals, and wavelengths and/or delays of the N first signals are different. The controller may determine, based on a characteristic of the transmit signal (wavelengths and/or delays of the N first signals are different), the echo signal in a signal received by the receiving assembly. A characteristic of the echo signal is the same as the characteristic of the transmit signal. Therefore, the controller can accurately determine, based on the characteristic of the transmit signal, the echo signal in the signal received by the receiving assembly. This improves object measurement accuracy.

In a possible implementation, the transmitting assembly includes a laser and a signal processor. The laser is configured to: generate a third signal, and send the third signal to the signal processor. The signal processor is configured to process the third signal to obtain the N first signals.

In the foregoing process, the N first signals with different wavelengths may be obtained by disposing one laser in the radar system, so that the radar system has low costs and a small size.

In a possible implementation, the signal processor includes a frequency multiplication crystal group and/or a delayer group. The frequency multiplication crystal group is configured to convert a signal with a single wavelength into signals with N wavelengths. The delayer group is configured to convert a signal with a single delay into signals with N delays.

In the foregoing process, the signals with N wavelengths may be generated through the frequency multiplication crystal group, and signals with N delays may be generated through a delayer. There is no need to dispose a plurality of lasers in the radar system, so that the radar system has low costs and a small size.

In a possible implementation, the signal with a single wavelength may be converted into the signals with N wavelengths in the following manner: converting the third signal into N first signals, where wavelengths of the N first signals are different.

In the foregoing process, the third signal generated by the laser is converted into the N first signals with different wavelengths, so as to generate the N signals with different wavelengths. The foregoing operation process is simple and easy to implement.

In a possible implementation, the frequency multiplication crystal group includes N−1 frequency multiplication crystals, the N first signals include the third signal and signals that are output by the N−1 frequency multiplication crystals, and wavelengths of the signals that are output by the frequency multiplication crystals are different.

In the foregoing process, each frequency multiplication crystal may output a signal with one wavelength. In this case, the N−1 frequency multiplication crystals output N−1 signals with different wavelengths. The wavelengths of the N−1 signals are different from a wavelength of the third signal, in this case, the N−1 signals that are output by the N−1 frequency multiplication crystals and the third signal constitute N signals with different wavelengths.

In a possible implementation, a signal with a single delay may be converted into signals with N delays in the following manner: converting the third signal into the N first signals, where delays of the N first signals are different.

In the foregoing process, the third signal generated by the laser is converted into the N first signals with different delays, to generate N signals with different delays. The foregoing operation process is simple and easy to implement.

In a possible implementation, the delayer group includes N−1 delayers, the N first signals include the third signal and signals that are output by the N−1 delayers, and delays of signals that are output by the delayers are different.

In the foregoing process, each delayer may output a signal with one delay. In this case, the N−1 delayers output N−1 signals with different delays. The delays of the N−1 signals are different from a delay of the third signal, in this case, the N−1 signals that are output by the N−1 delayers and the third signal constitute N signals with different delays.

In a possible implementation, a signal with a single wavelength may be converted into signals with N wavelengths in the following manner: converting the third signal into N fourth signals, and sending the fourth signals to the delayer group, where wavelengths of the N fourth signals are different. The delayer group separately performs delay processing on the N fourth signals to obtain the N first signals, where wavelengths of the N first signals are different, and delays of the N first signals are different.

In the foregoing process, the third signal that is output by the laser is first converted into the N fourth signals with different wavelengths, and then the N fourth signals are sent to the delayer group, so that the delayer group performs different delay processing on the N fourth signals, to obtain N first signals with different wavelengths and different delays. Only one laser is required to obtain the N first signals with different wavelengths and different delays, so that the radar system has low costs and a small size.

In a possible implementation, the signal processor further includes an optical fiber coupler, a first optical fiber, and a signal separation assembly, and the first optical fiber is separately connected to the first optical fiber coupler and the signal separation assembly. The first optical fiber coupler is configured to couple the N fourth signals to the optical fiber. The first optical fiber is configured to transmit the N fourth signals to the signal separation assembly. The signal separation assembly is configured to: separate the N fourth signals, and send the N separated fourth signals to the delayer group.

In the foregoing process, the first optical fiber is disposed in the radar system, so that the transmitting assembly may be deployed more flexibly.

In a possible implementation, the signal separation assembly includes N−1 grating elements, the delayer group includes N−1 delayers, and each grating element is configured to reflect a signal with one wavelength. The $i^{th}$ grating element is configured to: reflect the $i^{th}$ fourth signal, and transmit the $i^{th}$ fourth signal to the $i^{th}$ delayer. The $i^{th}$ delayer is configured to perform delay processing on the $i^{th}$ fourth signal to obtain the $i^{th}$ first signal, where i is a positive integer less than N. The $(N-1)^{th}$ grating element is further configured to transmit the $N^{th}$ fourth signal to obtain the $N^{th}$ first signal.

In the foregoing process, each grating element may reflect a signal with one wavelength and project a signal with another wavelength. In this way, signals with a plurality of wavelengths may be accurately separated.

In a possible implementation, the signal processor further includes N−1 circulators. Before transmitting the $i^{th}$ fourth signal to the $i^{th}$ delayer, the $i^{th}$ grating element is further configured to transmit the $i^{th}$ fourth signal to the $i^{th}$ circulator, and the $i^{th}$ circulator is configured to transmit the $i^{th}$ fourth signal in a preset direction. Correspondingly, the $i^{th}$ fourth signal that is output by the $i^{th}$ circulator is further transmitted to the $i^{th}$ delayer.

In the foregoing process, a signal transmission direction may be conveniently changed through the circulator, so that components in the radar system are deployed more flexibly.

In a possible implementation, the transmitting assembly further includes a fiber collimator, a beam splitter, a first detector, and a scanner. The fiber collimator is configured to transmit the N first signals to the beam splitter. The beam splitter is configured to: transmit the N first signals to the scanner based on first energy, and transmit the N first signals to the first detector based on second energy, where a ratio of the first energy to the second energy is a preset ratio. The scanner is configured to transmit the N received first signals. The first detector is configured to: convert the N received first signals into a first electrical signal, and send the first electrical signal to the controller. The controller is further configured to: when the second signal is an echo signal, perform at least one of the following processing based on the second signal and the first electrical signal: speed measurement, distance measurement, and positioning.

In the foregoing process, the beam splitter may split the first signal, so that the scanner may transmit a part of the first signal, and the first detector converts the part of the first signal into the first electrical signal and transmits the first electrical signal to the controller. In this way, the first electrical signal obtained by the controller may match the first signal transmitted by the scanner, so that the controller can accurately perform measurement (for example, speed measurement, distance measurement, or positioning).

In a possible implementation, the transmitting assembly further includes a neutral density filter, and the neutral density filter is located between the beam splitter and the first detector. The neutral density filter is configured to perform attenuation processing on the N first signals sent by the beam splitter to the first detector.

In the foregoing process, the neutral density filter may perform attenuation processing on the N first signals sent by the beam splitter to the first detector. In this way, damage to the first detector caused by excessively strong energy of the N first signals reaching the first detector may be avoided.

In a possible implementation, the controller is further configured to: generate a scan control signal, and send the scan control signal to the scanner, where the scan control signal is used to control an angle at which the scanner transmits a signal.

In a possible implementation, the transmitter transmits the N first signals based on the scan control signal.

In the foregoing process, the controller may control the angle at which the scanner transmits a signal. This not only flexibly controls the scanner, but also may control the scanner to transmit a signal at a wider angle.

In a possible implementation, the scanner is further configured to send angle data to the controller, where the angle data includes a transmit angle at one or more transmit moments.

In the foregoing process, after the scanner sends the angle data to the controller, the controller may learn the transmit angles of the scanner at the moments. In this way, the controller may control the scanner more accurately, and may perform more accurate measurement based on the angle data.

In a possible implementation, the controller is further configured to: generate a frequency control signal, and send the frequency control signal to the laser. The laser is specifically configured to generate the third signal based on the frequency control signal.

In the foregoing process, the controller may further control the laser to transmit the third signal, so that flexibility of the radar system is high.

In a possible implementation, the receiving assembly includes a telescope, a second optical fiber, and a second detector. The telescope is configured to: receive the second signal, and couple the second signal to the second optical fiber. The second optical fiber is configured to transmit the second signal to the second detector. The second detector is configured to: convert the second signal into a second electrical signal, and send the second electrical signal to the controller.

In the foregoing process, the second optical fiber may transmit the second signal received by the telescope, so that components in the receiving assembly are deployed more flexibly.

In a possible implementation, wavelengths of the N first signals are different, a quantity of second detectors is N, and the receiving assembly further includes a wavelength division multiplexer. The second optical fiber is specifically configured to transmit the second signal to the wavelength division multiplexer. The wavelength division multiplexer is configured to: determine N signals with different wavelengths in the second signal, and transmit each of the N signals with different wavelengths to a corresponding second detector.

In the foregoing process, the wavelength division multiplexer may accurately distinguish between signals with different wavelengths, so that wavelength components of the received second signal may be accurately separated.

In a possible implementation, the controller is specifically configured to: when the second signal includes the signals with N wavelengths and strength of each of the signals with N wavelengths is greater than a preset threshold, determine that the second signal is an echo signal.

In the foregoing process, when the transmit signal transmitted by the transmitting assembly includes the N first signals with different wavelengths, a characteristic of the echo signal is the same as a characteristic of the transmit signal. In the foregoing manner, the controller can accurately determine whether the second signal is the echo signal.

In a possible implementation, the controller is specifically configured to: when the second signal includes signals with N delays, a delay between peak moments of the signals with N delays meets a preset delay, and strength corresponding to each of peaks of the signals with N delays is greater than a preset threshold, determine that the second signal is an echo signal.

In the foregoing process, when the transmit signal transmitted by the transmitting assembly includes the N first signals with different delays, a characteristic of the echo signal is the same as a characteristic of the transmit signal. In the foregoing manner, the controller can accurately determine whether the second signal is the echo signal.

In a possible implementation, the controller is specifically configured to: when the second signal includes the signals with N wavelengths, different delays exist between signals with different wavelengths, strength of each of the signals with N wavelengths is greater than a preset threshold, and a delay between peak moments of the signals with N wavelengths meets a preset delay, determine that the second signal is the echo signal.

In the foregoing process, when the transmit signal transmitted by the transmitting assembly includes the N first signals with different wavelengths and different delays, a characteristic of the echo signal is the same as a characteristic of the transmit signal. In the foregoing manner, the controller can accurately determine whether the second signal is the echo signal.

According to a second aspect, an embodiment of this application provides a signal processing method, including: obtaining N first signals transmitted by a radar system, where characteristics of the N first signals are different, the characteristic includes a wavelength and/or a delay, and N is an integer greater than 1; obtaining a second signal received by the radar system; and determining, based on the characteristics of the N first signals, whether the second signal includes an echo signal corresponding to the first signal.

In the foregoing process, a transmit signal transmitted by the transmitting assembly includes N (N is an integer greater than 1) first signals, and wavelengths and/or delays of the N first signals are different. The controller may determine, based on a characteristic of the transmit signal (wavelengths and/or delays of the N first signals are different), the echo signal in a signal received by the receiving assembly. A characteristic of the echo signal is the same as the characteristic of the transmit signal. Therefore, the controller can accurately determine, based on the characteristic of the transmit signal, the echo signal in the signal received by the receiving assembly. This improves object measurement accuracy.

In a possible implementation, the determining based on the characteristics of the N first signals, whether the second signal includes an echo signal corresponding to the first signal includes: when the second signal includes signals with N wavelengths and strength of each of the signals with N wavelengths is greater than a preset threshold, determining that the second signal includes the echo signal.

In the foregoing process, when the transmit signal transmitted by the transmitting assembly includes the N first signals with different wavelengths, a characteristic of the echo signal is the same as a characteristic of the transmit signal. In the foregoing manner, the controller can accurately determine whether the second signal is the echo signal.

In a possible implementation, the determining based on the characteristics of the N first signals, whether the second signal includes an echo signal corresponding to the first signal includes: when the second signal includes signals with N delays, a delay between peak moments of the signals with N delays meets a preset delay, and strength corresponding to each of peaks of the signals with N delays is greater than a preset threshold, determining that the second signal includes the echo signal.

In the foregoing process, when the transmit signal transmitted by the transmitting assembly includes the N first signals with different delays, a characteristic of the echo signal is the same as a characteristic of the transmit signal. In the foregoing manner, the controller can accurately determine whether the second signal is the echo signal.

In a possible implementation, the determining based on the characteristics of the N first signals, whether the second signal includes an echo signal corresponding to the first signal includes: when the second signal includes signals with N wavelengths, different delays exist between signals with different wavelengths, strength of each of the signals with N wavelengths is greater than a preset threshold, and a delay between peak moments of the signals with N wavelengths meets a preset delay, determining that the second signal includes the echo signal.

In the foregoing process, when the transmit signal transmitted by the transmitting assembly includes the N first signals with different wavelengths and different delays, a characteristic of the echo signal is the same as a characteristic of the transmit signal. In the foregoing manner, the controller can accurately determine whether the second signal is the echo signal.

According to a third aspect, an embodiment of this application provides a signal processing apparatus, including a first obtaining module, a second obtaining module, and a determining module.

The first obtaining module is configured to obtain N first signals transmitted by a radar system, where characteristics of the N first signals are different, the characteristic includes a wavelength and/or a delay, and N is an integer greater than 1

The second obtaining module is configured to obtain a second signal received by the radar system.

The determining module is configured to determine, based on the characteristics of the N first signals, whether the second signal includes an echo signal corresponding to the first signal.

In a possible implementation, the determining module is specifically configured to:

when the second signal includes signals with N wavelengths and strength of each of the signals with N wavelengths is greater than a preset threshold, determine that the second signal includes the echo signal.

In a possible implementation, the determining based on the characteristics of the N first signals, whether the second signal includes an echo signal corresponding to the first signal includes:

when the second signal includes signals with N delays, a delay between peak moments of the signals with N delays meets a preset delay, and strength corresponding to each of peaks of the signals with N delays is greater than a preset threshold, determining that the second signal includes the echo signal.

In a possible implementation, the determining module is specifically configured to:

when the second signal includes signals with N wavelengths, different delays exist between signals with different wavelengths, strength of each of the signals with N wavelengths is greater than a preset threshold, and a delay between peak moments of the signals with N wavelengths meets a preset delay, determine that the second signal includes the echo signal.

According to a fourth aspect, an embodiment of this application provides a readable storage medium, where the readable storage medium stores a computer program, and the computer program is used to implement the signal processing method according to any one of the implementations of the third aspect.

According to a fifth aspect, an embodiment of this application provides a computer program product. The computer program product includes instructions, and when the instructions are executed, a computer is enabled to perform the signal processing method according to any one of the implementations of the third aspect.

According to the radar system, and the signal processing method and apparatus provided in embodiments of this application, the transmit signal transmitted by the transmitting assembly includes N (N is an integer greater than 1) first signals, and wavelengths and/or delays of the N first signals are different. The controller may determine, based on the characteristic of the transmit signal (wavelengths and/or delays of the N first signals are different), the echo signal in the signal received by the receiving assembly. A characteristic of the echo signal is the same as the characteristic of the transmit signal. Therefore, the controller can accurately determine, based on the characteristic of the transmit signal, the echo signal in the signal received by the receiving assembly. This improves object measurement accuracy.

DESCRIPTION OF EMBODIMENTS

For ease of understanding, an application scenario in this application is first described with reference to FIG. 1.

Figure 1:
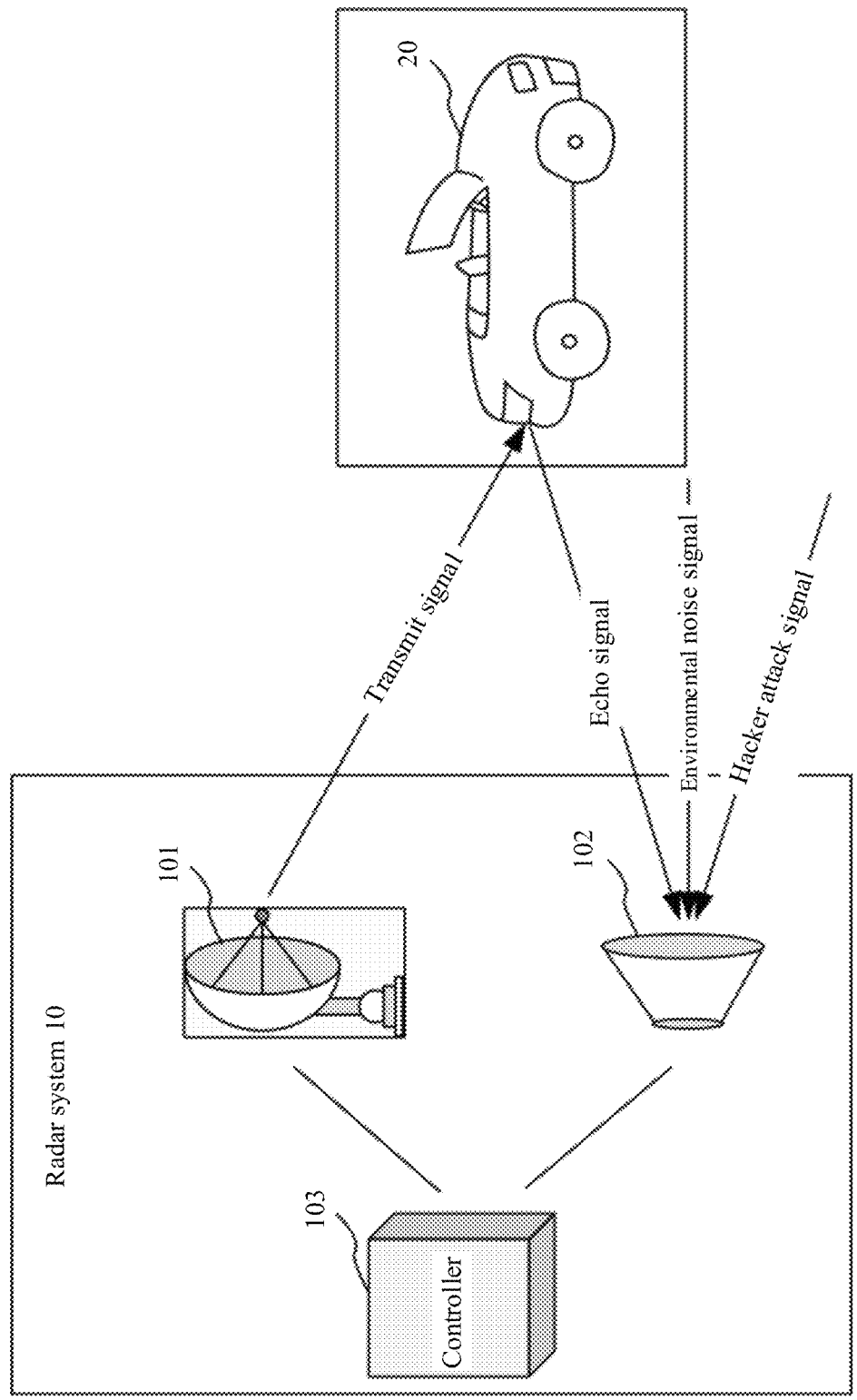
FIG. 1 is a schematic diagram of an application scenario according to an embodiment of this application.

FIG. 1 is a schematic diagram of an application scenario according to an embodiment of this application. As shown in FIG. 1, the application scenario includes a radar system 10 and a vehicle (an obstacle). The radar system 10 may include a transmitting assembly 101, a receiving assembly 102, and a controller 103.

The transmitting assembly 101 may transmit a signal. For ease of description, the signal transmitted by the transmitting assembly 101 is referred to as a transmit signal below. The transmitting assembly 101 may transmit a signal in a plurality of directions. For example, the controller 103 may control the transmitting assembly to transmit a signal in different directions. After the transmit signal reaches the obstacle, the obstacle reflects the transmit signal, and a signal reflected by the obstacle from the transmit signal may be referred to as an echo signal.

The receiving assembly 102 may receive a signal. The receiving assembly 102 may receive an echo signal and an interference signal. For example, the interference signal may include an environmental noise signal, a hacker attack signal, or a signal reflected by the obstacle from a transmit signal of another radar system. The radar system 10 may include one or more receiving assemblies 102. When the radar system 10 includes a plurality of receiving assemblies 102, the plurality of receiving assemblies 102 may be disposed at different locations, so that the receiving assemblies 102 can receive more echo signals reflected by a detection target.

The controller 103 may obtain the signal received by the receiving assembly 102, and determine the echo signal in the signal received by the receiving assembly 102. The controller 103 may further obtain the signal transmitted by the transmitting assembly 101, and measure an object (an obstacle) based on the transmit signal and the echo signal. Measuring an object may include: measuring a speed of the object (speed measurement), measuring a distance between the object and a radar (distance measurement), measuring a location of the object (positioning), and the like. The object may be a person, a vehicle, an airplane, or the like.

Figure 2:
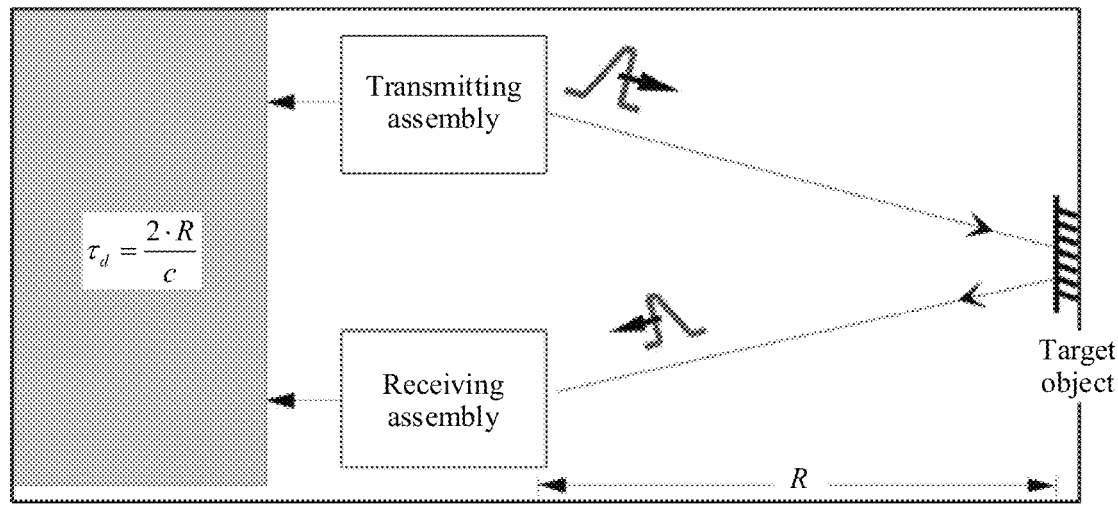
FIG. 2 is a schematic diagram of object measurement according to an embodiment of this application.

The following describes an object measurement process with reference to FIG. 2.

FIG. 2 is a schematic diagram of object measurement according to an embodiment of this application. As shown in FIG. 2, after a signal transmitted by a transmitting assembly arrives at a target object, the target object reflects the transmit signal, and a reflected signal arrives at a receiving assembly. A distance R between a radar system and the target object is determined based on a time of transmitting the signal by the transmitting assembly, a time of receiving the reflected signal by the receiving assembly, and a speed of light. The distance meets the following formula:

$$R = \frac{c \times \tau_d}{2}$$

R is the distance between the radar system and the target object, c is the speed of light, and $\tau_d$ is flight duration, where the flight duration is duration from the time of transmitting the signal by the transmitting assembly to the time of receiving the signal by the receiving assembly.

It should be noted that FIG. 2 merely shows an example of measuring the distance between the target object and the radar system, and imposes no limitation thereto. A manner of measuring the speed or the location of the object is similar to this process, and details are not described herein again.

For example, as shown in FIG. 1, after the transmit signal transmitted by the transmitting assembly 101 arrives at a vehicle, the vehicle may reflect the transmit signal. The receiving assembly 102 may receive an echo signal reflected by the vehicle from the transmit signal. Because there is also an environmental noise signal, a hacker attack signal, or the like, the receiving assembly 102 may further receive the environmental noise signal, the hacker attack signal, or the like. The controller 103 may determine the echo signal in the receiving assembly 102, and perform measurement (speed measurement, distance measurement, positioning, or the like) on the vehicle based on the echo signal and the transmit signal.

It should be noted that FIG. 1 is merely an example of the application scenario to which this application is applicable, and does not limit the application scenario. FIG. 1 shows only components included in the radar system 10 by using an example, and does not limit the radar system 10.

In an actual application process, a characteristic of an interference signal received by the receiving assembly 102 is relatively similar to that of the echo signal. Consequently, the controller cannot accurately identify the echo signal in a signal received by the receiving assembly 102. In this case, the controller cannot accurately measure the object.

To resolve the foregoing problem, a radar system is designed in this application. The radar system designed in this application may include a transmitting assembly, a receiving assembly, and a controller. A transmit signal transmitted by the transmitting assembly includes N (N is an integer greater than 1) first signals, and wavelengths and/or delays of the N first signals are different. The controller may determine, based on a characteristic of the transmit signal (the wavelengths and/or delays of the N first signals are different), an echo signal in a signal received by the receiving assembly. A characteristic of the echo signal is the same as the characteristic of the transmit signal. Therefore, the controller can accurately determine, based on the characteristic of the transmit signal, the echo signal in the signal received by the receiving assembly. This improves object measurement accuracy.

The following describes in detail a method shown in this application by using specific embodiments. It should be noted that the following several embodiments may be independent or may be combined with each other, and same or similar content is not described repeatedly in different embodiments.

Figure 3:
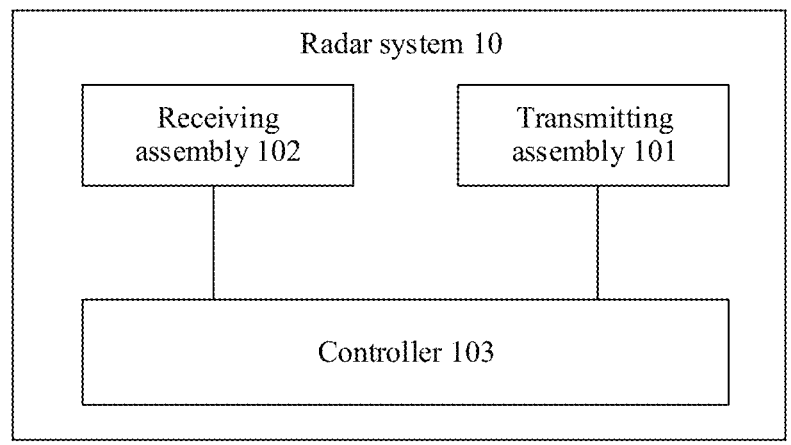
FIG. 3 is a schematic diagram of a structure of a radar system according to an embodiment of this application.

FIG. 3 is a schematic diagram of a structure of a radar system according to an embodiment of this application. As shown in FIG. 3, the radar system 10 may include a transmitting assembly 101, a receiving assembly 102, and a controller 103. The transmitting assembly 101 is configured to generate and transmit N first signals, where characteristics of the N first signals are different, the characteristic includes a wavelength and/or a delay, and N is an integer greater than 1. The receiving assembly 102 is configured to receive a second signal. The controller 103 is configured to determine, based on the characteristics of the N first signals, whether the second signal includes an echo signal corresponding to the first signal.

Optionally, the characteristics of the N first signals may include the following three cases.

Case 1: Wavelengths of every two of the N first signals are different.

In this case, the transmitting assembly 101 may generate the N first signals in the following manner.

Manner 1: The transmitting assembly 101 may include one laser. The laser may generate a signal with a single wavelength. The transmitting assembly 101 processes the signal with a single wavelength to obtain the N first signals with different wavelengths.

In this manner, the N first signals with different wavelengths may be obtained by using only the one laser, so that the radar system has low costs and a small size.

Manner 2: The transmitting assembly 101 may include N lasers, each laser generates one first signal, and wavelengths of the first signals generated by the lasers are different.

In this manner, the N first signals with different wavelengths may be generated by using the N lasers, and no additional signal processing needs to be performed. Therefore, an implementation process of the solution is simple.

Certainly, the transmitting assembly 101 may alternatively generate the N first signals in another manner. This is not specifically limited in this embodiment of this application.

In this case, delays of the N first signals may be the same or may be different. For example, the delays of the N first signals are all the same, or the delays of the N first signals are partially the same and partially different, or delays of every two of the N first signals are different.

Case 2: Delays of every two of the N first signals are different.

In this case, the transmitting assembly 101 may generate the N first signals in the following manner.

Manner 1: The transmitting assembly 101 may include one laser, the laser first generates a signal, and the transmitting assembly 101 performs different delay processing on the signal to obtain the N first signals with different delays.

For example, assuming that N is 3, the laser generates a signal 1, the transmitting assembly 101 performs delay processing on the signal 1 to obtain a signal 2, and the transmitting assembly 101 performs delay processing on the signal 1 or the signal 2 to obtain a signal 3. In this case, the obtained N (3) first signals are the signal 1, the signal 2, and the signal 3 respectively, and delays of the signal 1, the signal 2, and the signal 3 are different.

In this manner, the N first signals with different delays may be obtained by using only the one laser, so that the radar system has low costs and a small size.

Manner 2: The transmitting assembly 101 may include N lasers, and each laser generates one signal. The transmitting assembly 101 separately performs different delay processing on the signals generated by the lasers, to obtain the N first signals with different delays.

For example, assuming that N is 3, the transmitting assembly 101 may include three lasers: a laser 1, a laser 2, and a laser 3. The laser 1 may generate a signal 1, the laser 2 may generate a signal 2, and the laser 3 may generate a signal 3. In this case, different delay processing is performed on the signal 1, the signal 2, and the signal 3, to obtain three first signals, and delays of the three first signals are different.

In this case, wavelengths of the N first signals may be the same or may be different. For example, the wavelengths of the N first signals are all the same, or the wavelengths of the N first signals are partially the same and partially different, or wavelengths of every two of the N first signals are different.

Case 3: Wavelengths of every two of the N first signals are different, and delays of every two first signals are different.

In this case, the N first signals may be generated in the following manner: generating N signals with different wavelengths, and performing delay processing on the N signals with different wavelengths to obtain the N first signals.

The N signals with different wavelengths may be generated in Manner 1 and Manner 2 in Case 1, and delays of the N signals with different wavelengths are the same. After the N signals with different wavelengths are obtained, different delay processing may be performed on the N signals with different wavelengths to obtain the N first signals.

After the transmitting assembly 101 generates the N first signals, the transmitting assembly 101 may transmit the N first signals. Optionally, the transmitting assembly 101 may transmit the N first signals in a plurality of directions. For example, the transmitting assembly 101 may transmit the N first signals in the plurality of directions in a scanning form.

The receiving assembly 102 is configured to receive the second signal, and the radar system 10 may include one or more receiving assemblies 102. When the radar system 10 includes a plurality of receiving assemblies 102, the plurality of receiving assemblies 102 may be disposed at different locations, so that the receiving assemblies 102 can receive more echo signals reflected by a detection target. The second signal received by the receiving assembly 102 may be an echo signal, or may be an interference signal, or the second signal may include an echo signal and an interference signal.

The controller 103 may perform analysis processing on the second signal based on the characteristics of the N first signals, to determine whether the second signal includes the echo signal corresponding to the first signal.

Optionally, if the wavelengths of the N first signals are different, wavelength separation processing may be performed on the second signal, so as to distinguish signals with different wavelengths from the second signal and then determine, based on the wavelengths of the signals distinguished from the second signal, whether the second signal includes the echo signal corresponding to the first signal. For example, it is assumed that N is 3, and wavelengths of the three first signals are respectively $\lambda_1$, $\lambda_2$, and $\lambda_3$. In this case, after the second signal is received, if signals with three wavelengths may be distinguished from the second signal, and the wavelengths of the three signals are respectively $\lambda_1$, $\lambda_2$, and $\lambda_3$, it may be determined that the second signal includes the echo signal corresponding to the first signal.

Optionally, if the delays of the N first signals are different, it may be determined, based on a delay of a signal included in the second signal, whether the second signal includes the echo signal corresponding to the first signal. For example, it is assumed that N is 3, and the three first signals are respectively a signal 1, a signal 2, and a signal 3. In this case, if a delay between the signal 1 and the signal 2 is $t_1$, and a delay between the signal 2 and the signal 3 is $t_2$, after the second signal is received, if there are three signals (there are three peaks) in the second signal, and delays between the three peaks are sequentially $t_1$ and $t_2$, it may be determined that the second signal includes the echo signal corresponding to the first signal.

Optionally, if the wavelengths of the N first signals are different, and the delays of the N first signals are different, wavelength separation processing may be performed on the second signal, so as to distinguish signals with different wavelengths from the second signal then determine, based on the wavelengths and delays of the signals distinguished from the second signal, whether the second signal includes the echo signal corresponding to the first signal. For example, it is assumed that N is 3, the three first signals are respectively a signal 1, a signal 2, and a signal 3, and wavelengths of the signal 1, the signal 2, and the signal 3 are respectively $\lambda_1$, $\lambda_2$, and $\lambda_3$. In this case, if a delay between the signal 1 and the signal 2 is $t_1$, and a delay between the signal 2 and the signal 3 is $t_2$, after the second signal is received, if signals with three wavelengths can be distinguished from the second signal, the wavelengths of the three signals are respectively $\lambda_1$, $\lambda_2$, and $\lambda_3$, and delays between the three signals are sequentially $t_1$ and $t_2$, it may be determined that the second signal includes the echo signal corresponding to the first signal.

In the radar system shown in FIG. 3, a transmit signal transmitted by the transmitting assembly includes the N (N is an integer greater than 1) first signals, and the wavelengths and/or delays of the N first signals are different. The controller may determine, based on a characteristic of the transmit signal (the wavelengths and/or delays of the N first signals are different), an echo signal in a signal received by the receiving assembly. A characteristic of the echo signal is the same as the characteristic of the transmit signal. Therefore, the controller can accurately determine, based on the characteristic of the transmit signal, the echo signal in the signal received by the receiving assembly. This improves object measurement accuracy.

Based on any one of the foregoing embodiments, a basis (a determining basis for short below) for the radar system to determine whether the second signal includes an echo signal may include wavelength characteristics and/or delay characteristics of the N first signals. A structure of the radar system varies with the determining basis of the radar system. The following describes radar systems of different structures with reference to embodiments shown in FIG. 4 to FIG. 9.

Figure 4:
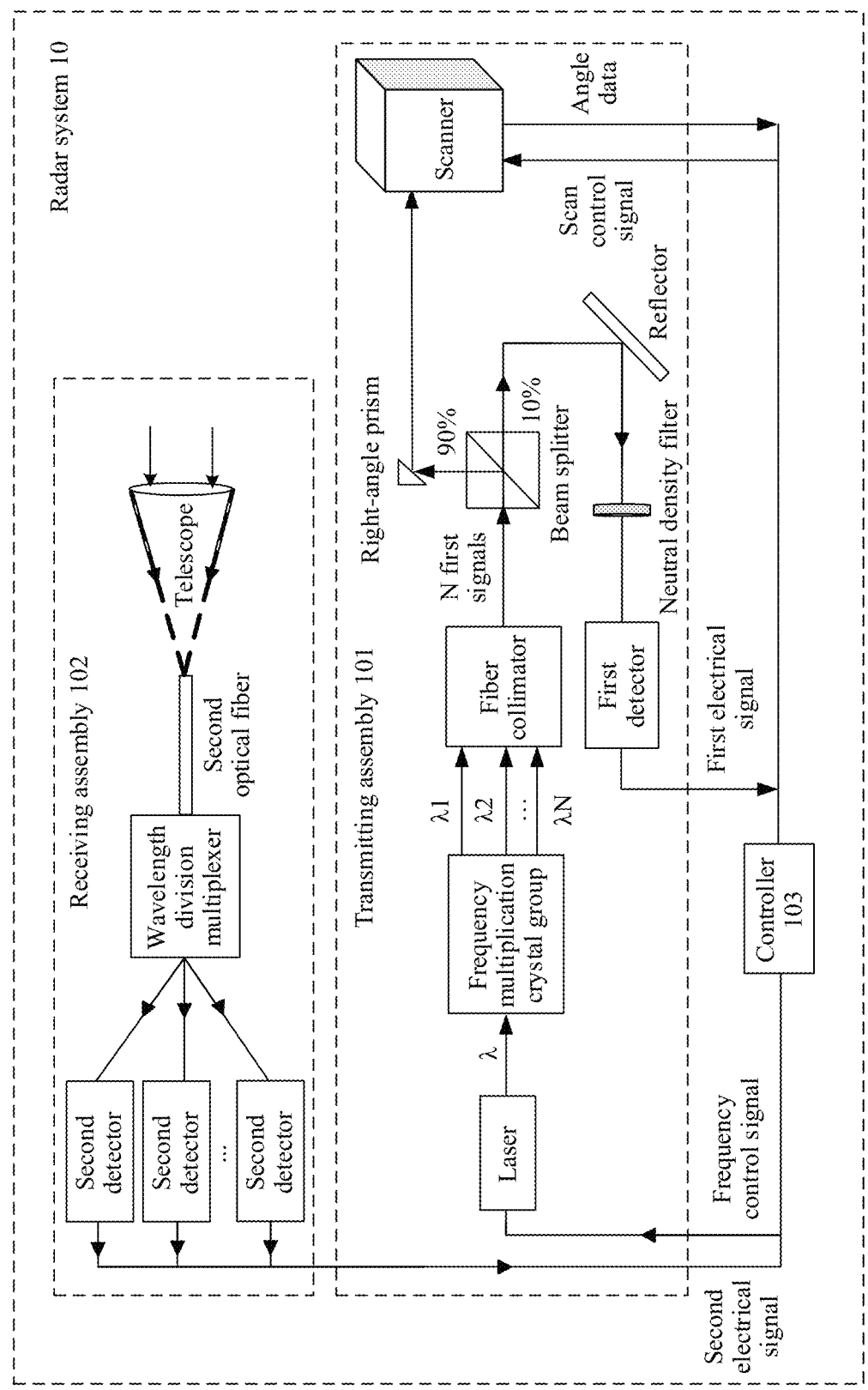
FIG. 4 is a schematic diagram of a structure of another radar system according to an embodiment of this application.

FIG. 4 is a schematic diagram of a structure of another radar system according to an embodiment of this application. In the embodiment shown in FIG. 4, a determining basis of the radar system is wavelengths of N first signals. Based on the embodiment shown in FIG. 3, the following describes the components in the radar system with reference to FIG. 4.

As shown in FIG. 4, the transmitting assembly 101 includes a laser, a frequency multiplication crystal group (a signal processor), a fiber collimator, a beam splitter, a reflector, a neutral density filter, a first detector, a right-angle prism, and a scanner. The following separately describes the components included in the transmitting assembly 101.

The laser is configured to: generate a third signal, and transmit the third signal to the frequency multiplication crystal group. The third signal is a signal with a single wavelength, and the third signal is an optical signal. Energy of the third signal is within a personnel safety range. Optionally, the controller 103 may transmit a frequency control signal to the laser, so that the laser generates the third signal based on the frequency control signal. A frequency controller is configured to control a frequency of the third signal generated by the laser.

The frequency multiplication crystal group may convert the third signal into N first signals, where wavelengths of the N first signals are different, and the first signal is an optical signal. Optionally, the frequency multiplication crystal group may include N−1 frequency multiplication crystals, and each frequency multiplication crystal may output a first signal with one wavelength. Correspondingly, the N first signals include the third signal and signals that are output by the N−1 frequency multiplication crystals. The frequency multiplication crystal is used to change a frequency of a signal, so as to change a wavelength of the signal. The frequency multiplication crystal has a frequency multiplication coefficient. When frequency multiplication coefficients of the frequency multiplication crystals are different, the frequency multiplication crystals may change the wavelengths of the signals to different degrees.

Figure 5A:
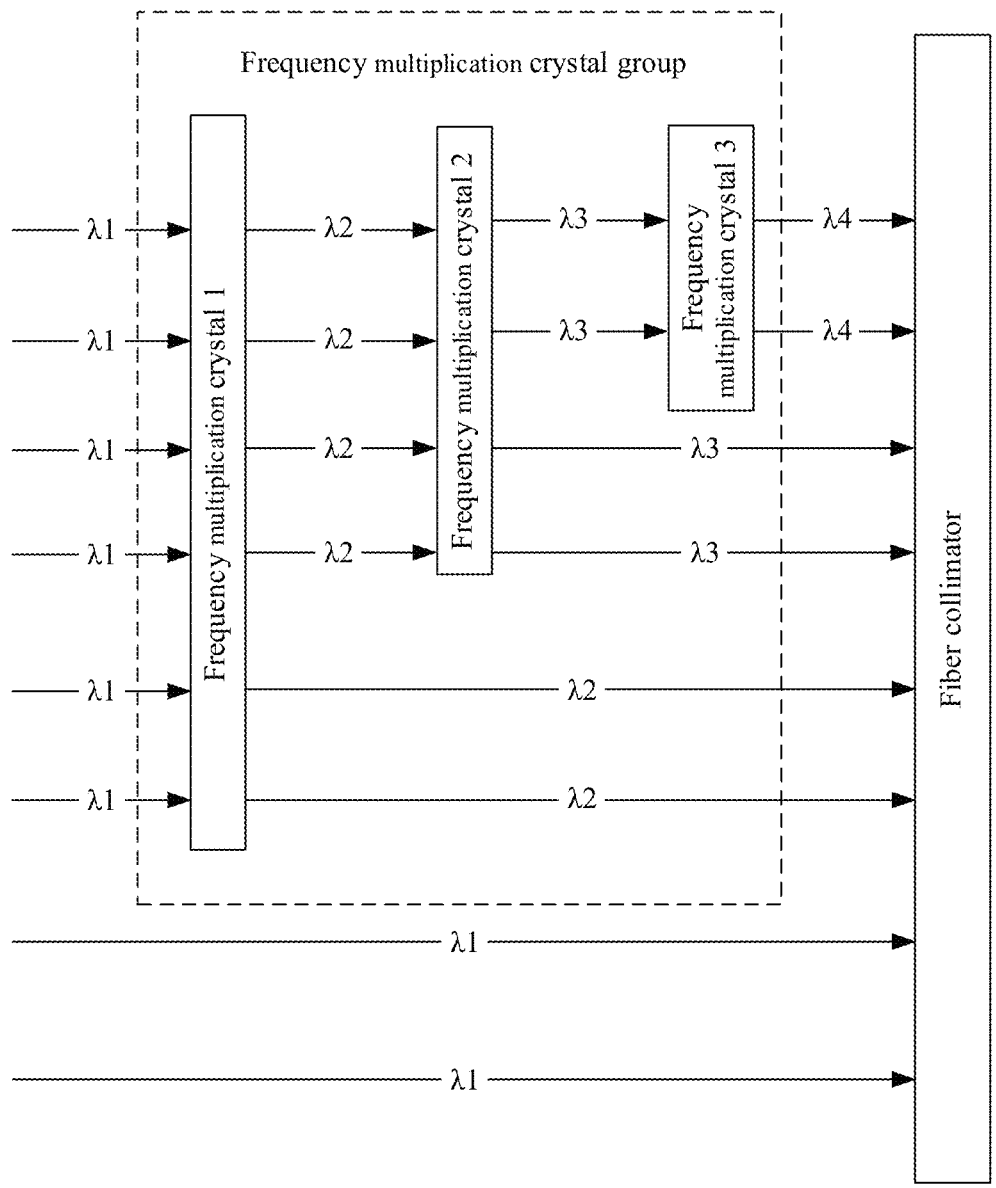
FIG. 5A is a schematic diagram of a structure of a frequency multiplication crystal group according to an embodiment of this application.
Figure 5B:
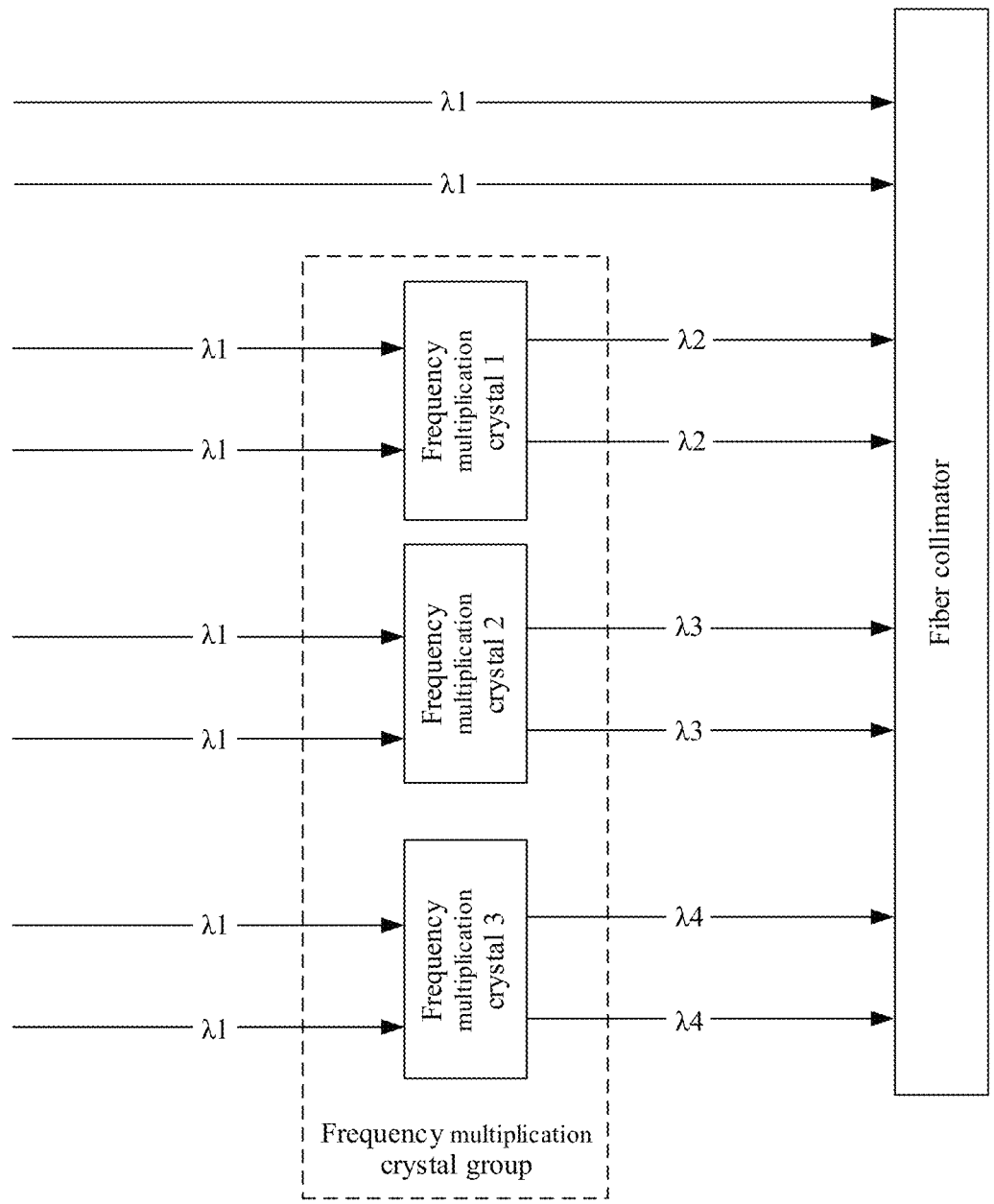
FIG. 5B is a schematic diagram of a structure of another frequency multiplication crystal group according to an embodiment of this application.

The following describes a structure of a frequency multiplication crystal group with reference to FIG. 5A and FIG. 5B.

FIG. 5A is a schematic diagram of a structure of a frequency multiplication crystal group according to an embodiment of this application. frequency multiplication crystals in the frequency multiplication crystal group are sequentially arranged. A third signal transmitted by a laser is transmitted to the first frequency multiplication crystal and a fiber collimator. The $i^{th}$ frequency multiplication crystal and the $(i+1)^{th}$ frequency multiplication crystal partially overlap, so that a part of a signal transmitted by the $i^{th}$ frequency multiplication crystal is transmitted to the fiber collimator, and the other part of the signal is transmitted to the $(i+1)^{th}$ frequency multiplication crystal. Herein, i is an integer from 1 to N−2. A signal transmitted by the $(N−1)^{th}$ frequency multiplication crystal is transmitted to the fiber collimator. Frequency multiplication coefficients of different frequency multiplication crystals in the frequency multiplication crystal group may be the same or may be different.

For ease of description, FIG. 5A is described by using an example in which the frequency multiplication crystal group may include three frequency multiplication crystals. As shown in FIG. 5A, the frequency multiplication crystal group includes a frequency multiplication crystal 1, a frequency multiplication crystal 2, and a frequency multiplication crystal 3. It is assumed that a wavelength of the third signal transmitted by the laser is and the third signal (with the wavelength of $\lambda_1$) transmitted by the laser is transmitted to the frequency multiplication crystal 1 and the fiber collimator. The frequency multiplication crystal 1 performs wavelength processing on the signal with the wavelength of $\lambda_1$, and emits a signal with a wavelength of $\lambda_2$. The signal with the wavelength of $\lambda_2$ is transmitted to the frequency multiplication crystal 2 and the fiber collimator, and the frequency multiplication crystal 2 performs wavelength processing on the signal with the wavelength of $\lambda_2$, and emits a signal with a wavelength of $\lambda_3$. The signal with the wavelength of $\lambda_3$ is transmitted to the frequency multiplication crystal 3 and the fiber collimator, and the frequency multiplication crystal 3 performs wavelength processing on the signal with the wavelength of $\lambda_3$, and emits a signal with a wavelength of $\lambda_4$. The signal with the wavelength of $\lambda_4$ is transmitted to the fiber collimator. It can be learned from the foregoing descriptions that the frequency multiplication crystal group may obtain first signals with the wavelengths of $\lambda_1$, $\lambda_2$, $\lambda_3$, and $\lambda_4$ by processing the third signal transmitted by the laser, and transmit the first signals with the wavelengths of $\lambda_1$, $\lambda_2$, $\lambda_3$, and $\lambda_4$ to the fiber collimator.

FIG. 5B is a schematic diagram of a structure of another frequency multiplication crystal group according to an embodiment of this application. frequency multiplication crystals in the frequency multiplication crystal group are sequentially arranged. A third signal transmitted by a laser is separately transmitted to each frequency multiplication crystal and a fiber collimator. Each frequency multiplication crystal has a different frequency multiplication coefficient, and may change a wavelength of the third signal to a different degree. A signal that is output by each frequency multiplication crystal is transmitted to the fiber collimator.

For ease of description, FIG. 5B is described by using an example in which the frequency multiplication crystal group may include three frequency multiplication crystals. As shown in FIG. 5B, the frequency multiplication crystal group includes a frequency multiplication crystal 1, a frequency multiplication crystal 2, and a frequency multiplication crystal 3. It is assumed that a wavelength of the third signal transmitted by the laser is $\lambda_1$, and the third signal (with the wavelength of $\lambda_1$) transmitted by the laser is transmitted to the frequency multiplication crystal 1, the frequency multiplication crystal 2, the frequency multiplication crystal 3, and the fiber collimator. The frequency multiplication crystal 1 performs wavelength processing on the signal with the wavelength of $\lambda_1$ to obtain a signal with a wavelength of $\lambda_2$, and transmits the signal with the wavelength of $\lambda_2$ to the fiber collimator. The frequency multiplication crystal 2 performs wavelength processing on the signal with the wavelength of $\lambda_1$ to obtain a signal with a wavelength of $\lambda_3$, and transmits the signal with the wavelength of $\lambda_3$ to the fiber collimator. The frequency multiplication crystal 3 performs wavelength processing on the signal with the wavelength of $\lambda_1$ to obtain a signal with a wavelength of $\lambda_4$, and transmits the signal with the wavelength of $\lambda_4$ to the fiber collimator. It can be learned from the foregoing descriptions that the frequency multiplication crystal group may obtain first signals with the wavelengths of $\lambda_1$, $\lambda_2$, $\lambda_3$, and $\lambda_4$ by processing the third signal transmitted by the laser, and transmit the first signals with the wavelengths of $\lambda_1$, $\lambda_2$, $\lambda_3$, and $\lambda_4$ to the fiber collimator.

It should be noted that, when the frequency multiplication crystal group includes N−1 frequency multiplication crystals, N−1 optical signals are transmitted from the frequency multiplication crystal group, and the laser further transmits an optical signal to the fiber collimator.

The fiber collimator may perform collimation processing on the N first signals, and transmit the collimated N first signals to a beam splitter. The N first signals received by the fiber collimator are N optical signal beams. The fiber collimator may combine the N optical signal beams optical signals into an optical signal beam (that is, the N collimated first signals are combined as an optical signal beam), and transmit the optical signal beam to the beam splitter.

The beam splitter may transmit the N first signals to a scanner based on first energy, and transmit the N first signals to a first detector based on second energy, where a ratio of the first energy to the second energy is a preset ratio. It may also be understood that the beam splitter divides the N first signals into two signal beams, energy of the two signal beams is respectively first energy and second energy, and the two signal beams each include the N first signals. A sum of the first energy and the second energy may be energy of the N first signals before beam splitting. Optionally, the preset ratio may be 9:1, 8:2, or the like. The preset ratio may be set based on an actual requirement. FIG. 4 shows the preset ratio only by using an example, and does not constitute a limitation.

The N first signals transmitted by the beam splitter to the scanner may pass through a right-angle prism, and the right-angle prism is configured to change a light transmission direction. Certainly, the transmitting assembly 101 may alternatively not include the right-angle prism, or the right-angle prism may be replaced with another component.

After receiving the N first signals, the scanner may transmit the N first signals in a plurality of directions. For example, the scanner may implement 360-degree signal transmission in horizontal and vertical directions. Optionally, a motor and the controller 103 may be used to control the scanner to transmit the N first signals in different directions. For example, the controller 103 may send a scan control signal to the motor, and the motor rotates based on the scan control signal, to drive the scanner to rotate. When the scanner rotates, the scanner transmits a signal, to transmit the N first signals in different directions. The scanner may further send angle data to the controller. The angle data includes a transmit angle of the scanner at one or more moments.

The N first signals transmitted by the beam splitter to the first detector may pass through a reflector and a neutral density filter. The reflector is configured to change a propagation direction of the optical signal. Certainly, the transmitting assembly 101 may alternatively not include the reflector, or the reflector may be replaced with another component. The neutral density filter is configured to perform attenuation processing on the N first signals sent by the beam splitter to the first detector. In this way, damage to the first detector caused by excessively strong energy of the N first signals reaching the first detector may be avoided.

The first detector is configured to: convert the N received first signals into a first electrical signal, and send the first electrical signal to the controller.

It should be noted that FIG. 4 merely shows components included in the transmitting assembly 101 by using an example, and does not limit the components included in the transmitting assembly 101. For example, a component in the transmitting assembly 101 may be replaced with another component with a same function, or some components (for example, the reflector) in the transmitting assembly 101 are optional components (components that can be removed). An additional component may be further additionally disposed in the transmitting assembly 101, so that the transmitting assembly has another additional function.

As shown in FIG. 4, the receiving assembly 102 includes a telescope, a second optical fiber, a wavelength division multiplexer, and N second detectors. The following separately describes the components included in the receiving assembly 102.

The telescope is configured to: receive a second signal, and couple the second signal to the second optical fiber. The second signal is an optical signal. The second optical fiber is configured to transmit the second signal to the wavelength division multiplexer. Optionally, the receiving assembly 102 may further include a narrowband filter, and the narrowband filter is disposed between the telescope and the second optical fiber. A second signal emitted by the telescope may be transmitted to the narrowband filter, and the narrowband filter processes the second signal. The narrowband filter may transmit the processed signal to the second optical fiber.

The wavelength division multiplexer is configured to: determine N signals with different wavelengths in the second signal, and transmit each of the N signals with different wavelengths to a corresponding second detector. It should be noted that, if the second signal includes an echo signal, the wavelength division multiplexer may determine the N signals with different wavelengths in the second signal. If the second signal does not include an echo signal, the wavelength division multiplexer may fail to determine the N signals with different wavelengths in the second signal. In this case, if the wavelength division multiplexer determines, from the second signal, M (an integer less than N) signals with different wavelengths, the wavelength division multiplexer may transmit the M signals with different wavelengths to any M second detectors.

The second detector is configured to: convert the second signal into a second electrical signal, and send the second electrical signal to the controller. Because there are N second detectors, the controller may receive N second electrical signals.

It should be noted that FIG. 4 merely shows components included in the receiving assembly 102 by using an example, and does not limit the components included in the receiving assembly 102.

After receiving the second electrical signal, the controller may determine, based on the N wavelengths of the N first signals and the second electrical signal, whether the second signal includes an echo signal corresponding to the first signal. Optionally, the controller may determine, by using the following step 1 to step 3, whether the second signal includes the echo signal corresponding to the first signal:

Step 1: Perform noise reduction processing on the second electrical signal.

Noise reduction processing may be performed on the second electrical signal through a preset filter, so as to eliminate impact of environmental noise on an echo signal.

Step 2: Obtain peak strengths of the N second electrical signals.

Peak strengths of the N second electrical signals may be obtained by using a waveform fitting algorithm.

Step 3: If the N second electrical signals meet the following condition a and condition b, determine that the second signal includes an echo component corresponding to the first signal.

Condition a: The N second electrical signals include N wavelength components.

Condition b: Peak strengths of the N second electrical signals are all greater than a preset strength.

In the condition a, if the N second electrical signals include N wavelength components, the second signal includes signals with N wavelengths. In the condition b, if the peak strengths of the N second electrical signals are greater than the preset strength, strength of each of the signals with N wavelengths included in the second signal is greater than the preset threshold.

When the controller determines that the second signal includes the echo component corresponding to the first signal, the controller may determine the echo component in the second signal and measure an object based on the echo component and the first electrical signal. When ranging is performed on the object, strength and distances of the N second electrical signals may be calculated based on a time-of-flight principle, and superimposition averaging processing is performed, so as to increase a signal-to-noise ratio of the ranging.

In the radar system shown in FIG. 4, a transmit signal transmitted by the transmitting assembly includes N (N is an integer greater than 1) first signals, wavelengths of the N first signals are different, and the controller may determine, based on a characteristic of the transmit signal (the wavelengths of the N first signals are different), an echo signal in a signal received by the receiving assembly. A characteristic of the echo signal is the same as the characteristic of the transmit signal. Therefore, the controller can accurately determine, based on the characteristic of the transmit signal, the echo signal in the signal received by the receiving assembly. This improves object measurement accuracy.

Figure 6:
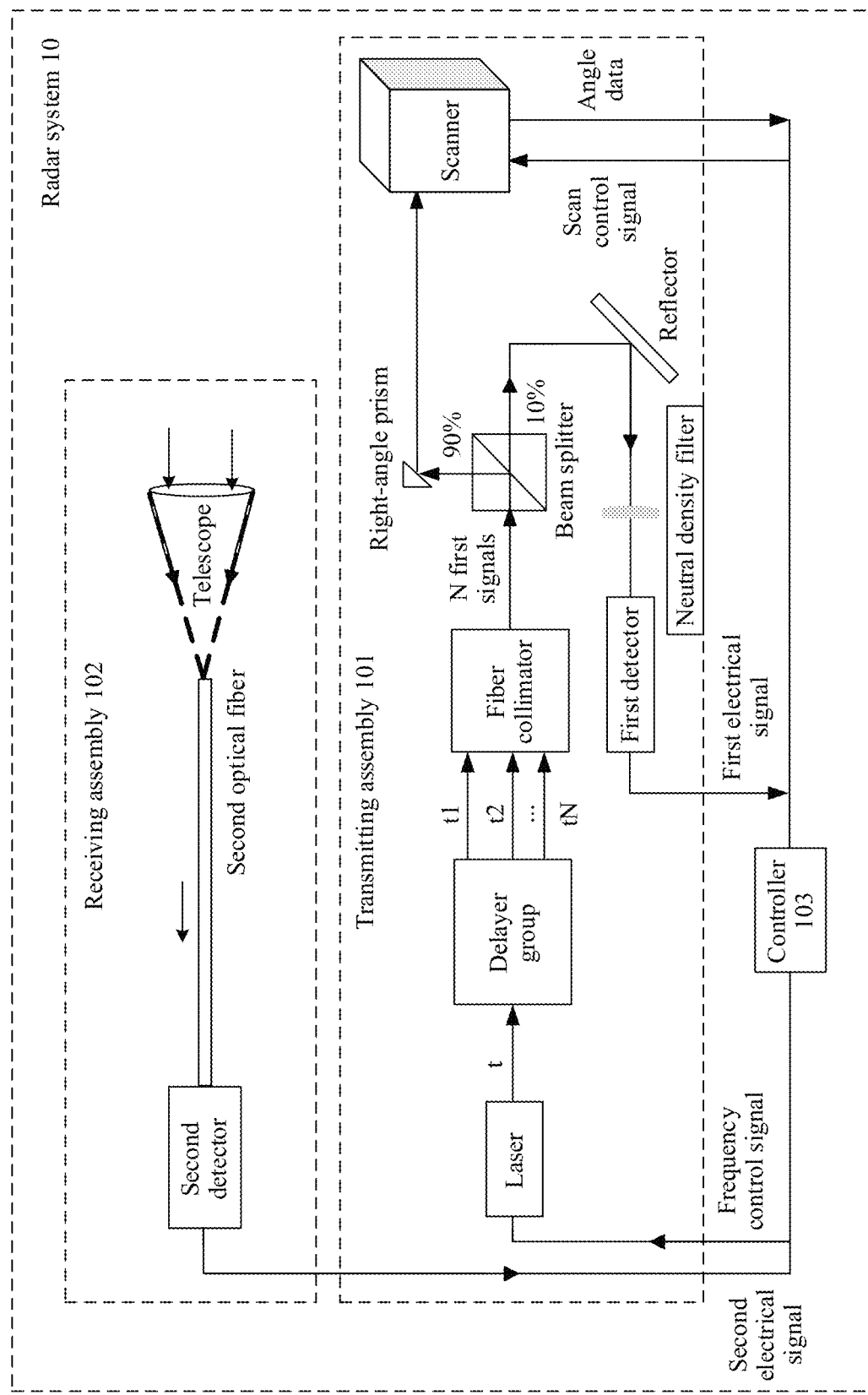
FIG. 6 is a schematic diagram of a structure of still another radar system according to an embodiment of this application.

FIG. 6 is a schematic diagram of a structure of still another radar system according to an embodiment of this application. In the embodiment shown in FIG. 6, a determining basis of the radar system is delays of the N first signals. Based on the embodiment shown in FIG. 3, the following describes the components in the radar system with reference to FIG. 6.

As shown in FIG. 6, the transmitting assembly 101 includes a laser, a delayer group (a signal processor), a fiber collimator, a beam splitter, a reflector, a neutral density filter, a first detector, a right-angle prism, and a scanner.

It should be noted that, for descriptions of the laser, the fiber collimator, the beam splitter, the reflector, the neutral density filter, the first detector, the right-angle prism, and the scanner shown in FIG. 6, refer to the embodiment shown in FIG. 4. Details are not described herein again.

The delayer group may convert a third signal generated by the laser into N first signals, where delays of the N first signals are different, and the N first signals are optical signals. Optionally, the delayer group includes N−1 delayers, and each delayer may output a first signal with one delay. Correspondingly, the N first signals include a third signal and signals that are output by the N−1 delayers, and delays of the signals that are output by the delayers are different. The delayer is configured to change a delay of a signal. Different delayers may delay a signal for different duration.

The following describes a structure of the delayer group with reference to FIG. 7.

Figure 7A:
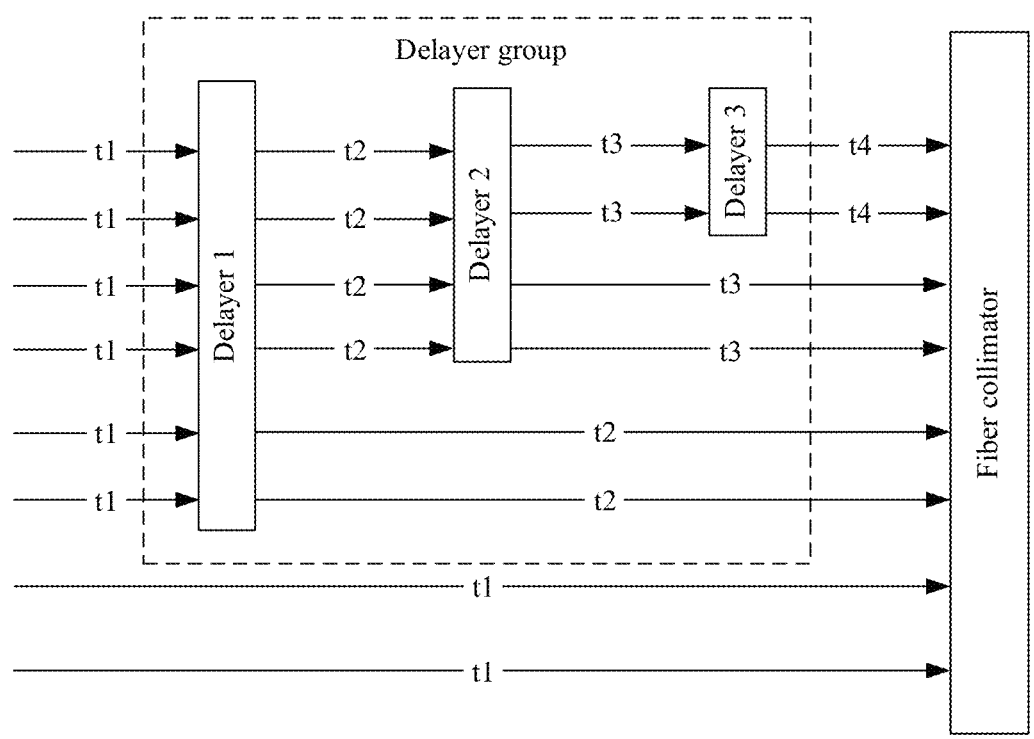
FIG. 7A is a schematic diagram of a structure of a delayer group according to an embodiment of this application.

FIG. 7A is a schematic diagram of a structure of a delayer group according to an embodiment of this application. Delayers in the delayer group are sequentially arranged. A third signal transmitted by a laser is transmitted to a first delayer and a fiber collimator, and a signal processed by the $i^{th}$ delayer may be transmitted to the $i^{th}$ delayer and the fiber collimator. Herein, i is an integer from 1 to N−2. A signal processed by the $(N-1)^{th}$ delayer is transmitted to the fiber collimator. Delay duration of different delayers in the delayer group may be the same or may be different.

For ease of description, FIG. 7A is described by using an example in which the delayer group may include three delayers. As shown in FIG. 7A, the delayer group includes a delayer 1, a delayer 2, and a delayer 3. It is assumed that a delay of the third signal transmitted by the laser is $t_1$, and the third signal (with the delay of $t_1$) transmitted by the laser is transmitted to the delayer 1 and the fiber collimator. The delayer 1 performs delay processing on the signal with the delay of $t_1$, and emits a signal with a delay of $t_2$. The signal with the delay of $t_2$ is transmitted to the delayer 2 and the fiber collimator. The delayer 2 performs delay processing on the signal with the delay of $t_2$, and emits a signal with a delay of $t_3$. The signal with the delay of $t_3$ is transmitted to the delayer 3 and the fiber collimator. The delayer 3 performs delay processing on the signal with the delay of $t_3$, and emits a signal with a delay of $t_4$. The signal with the delay of $t_4$ is transmitted to the fiber collimator. It can be learned from the foregoing descriptions that the delayer group may obtain first signals with delays of $t_1$, $t_2$, $t_3$, and $t_4$ by processing the third signal transmitted by the laser, and transmit the first signals with the delays of $t_1$, $t_2$, $t_3$, and $t_4$ to the fiber collimator.

Figure 7B:
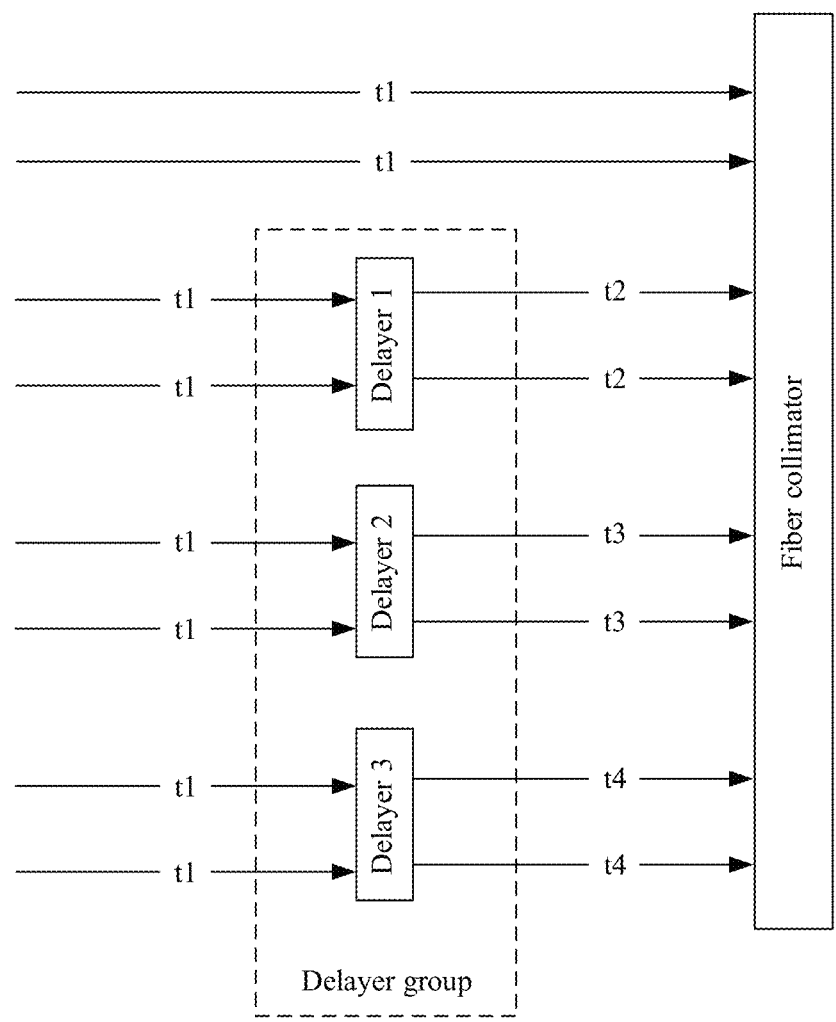
FIG. 7B is a schematic diagram of a structure of another delayer group according to an embodiment of this application.

FIG. 7B is a schematic diagram of a structure of another delayer group according to an embodiment of this application. Delayers in the delayer group are sequentially arranged. A third signal transmitted by a laser is separately transmitted to each delayer and a fiber collimator. Each delayer may delay the third signal for different duration, and a signal that is output by each delayer is transmitted to the fiber collimator.

For ease of description, FIG. 7B is described by using an example in which the delayer group may include three delayers. As shown in FIG. 7B, the delayer group includes a delayer 1, a delayer 2, and a delayer 3. It is assumed that a delay of the third signal transmitted by the laser is $t_1$, and the third signal (with the delay of $t_1$) transmitted by the laser is transmitted to the delayer 1, the delayer 2, the delayer 3, and the fiber collimator. The delayer 1 performs delay processing on the signal with the delay of $t_1$ to obtain a signal with a delay of $t_1$, and emits the signal with the delay of $t_2$ to the fiber collimator. The delayer 2 performs delay processing on the signal with the delay of $t_1$ to obtain a signal with a delay of $t_1$, and emits the signal with the delay of $t_3$ to the fiber collimator. The delayer 3 performs delay processing on the signal with the delay of $t_1$ to obtain a signal with a delay of $t_1$, and emits the signal with the delay of $t_4$ to the fiber collimator. It can be learned from the foregoing descriptions that the delayer group may obtain first signals with delays of $t_1$, $t_2$, $t_3$, and $t_4$ by processing the third signal transmitted by the laser, and transmit the first signals with the delays of $t_1$, $t_2$, $t_3$, and $t_4$ to the fiber collimator.

It should be noted that FIG. 7 merely shows components included in the transmitting assembly 101 by using an example, and does not limit the components included in the transmitting assembly 101. For example, a component in the transmitting assembly 101 may be replaced with another component with a same function, or some components (for example, the reflector) in the transmitting assembly 101 are optional components (components that can be removed). An additional component may be further additionally disposed in the transmitting assembly 101, so that the transmitting assembly has another additional function.

It should be noted that, when the delayer group includes N−1 delayers, N−1 optical signals are transmitted from the delayer group, and the laser further transmits an optical signal to the fiber collimator.

As shown in FIG. 6, the receiving assembly 102 includes a telescope, a second optical fiber, and a second detector. The following separately describes the components included in the receiving assembly 102.

It should be noted that, for the telescope and the second optical fiber shown in FIG. 6, refer to descriptions in the embodiment in FIG. 4. Details are not described herein again.

The second detector is configured to: convert the second signal into a second electrical signal, and send the second electrical signal to the controller. After receiving the second electrical signal, the controller may determine, based on the N delays of the N first signals and the second electrical signal, whether the second signal includes an echo signal corresponding to the first signal. Optionally, the controller may determine, by using the following step 1 to step 3, whether the second signal includes the echo signal corresponding to the first signal:

Step 1: Perform noise reduction processing on the second electrical signal.

Noise reduction processing may be performed on the second electrical signal through a preset filter, so as to eliminate impact of environmental noise on an echo signal.

Step 2: Obtain peak strengths and peak moments of the N second electrical signals.

Peak strengths of the N second electrical signals may be obtained by using a waveform fitting algorithm. It is assumed that peak strengths of the N second electrical signals are respectively $A_{p1}, A_{p2}, \ldots,$ and $A_{pN}$.

Step 3: If the N second electrical signals meet the following condition a and condition b, determine that the second signal includes an echo component corresponding to the first signal.

Condition a: Delays between the N peak moments meet a preset delay.

Condition b: Peak strengths of the N second electrical signals are all greater than a preset strength.

In the condition a, if the delays between the N peak moments meet the preset delay, peak moments of signals with N delays included in the second signal meet the preset delay. In the condition b, if the peak strengths of the N second electrical signals are greater than the preset strength, strength of each of the signals with N wavelengths included in the second signal is greater than the preset threshold.

When the controller determines that the second signal includes the echo component corresponding to the first signal, the controller may determine the echo component in the second signal and measure an object based on the echo component and the first electrical signal. When ranging is performed on the object, strength and distances of the N second electrical signals may be calculated based on a time-of-flight principle, and superimposition averaging processing is performed, so as to increase a signal-to-noise ratio of the ranging.

In the radar system shown in FIG. 6, a transmit signal transmitted by the transmitting assembly includes N (N is an integer greater than 1) first signals, and delays of the N first signals are different. The controller may determine, based on a characteristic of the transmit signal (the delays of the N first signals are different), an echo signal in a signal received by the receiving assembly. A characteristic of the echo signal is the same as the characteristic of the transmit signal. Therefore, the controller can accurately determine, based on the characteristic of the transmit signal, the echo signal in the signal received by the receiving assembly. This improves object measurement accuracy.

Figure 8:
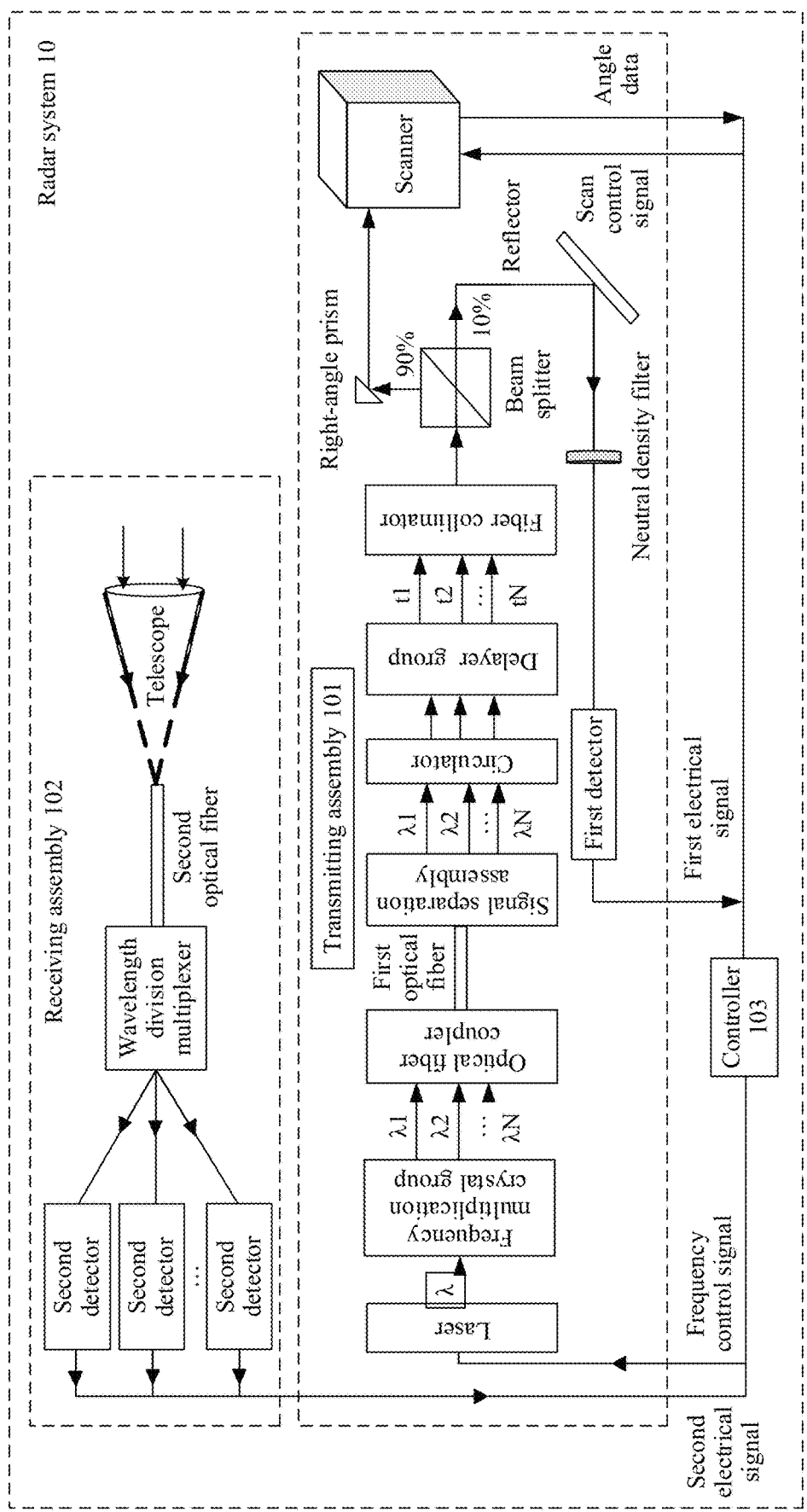
FIG. 8 is a schematic diagram of a structure of yet another radar system according to an embodiment of this application.

FIG. 8 is a schematic diagram of a structure of yet another radar system according to an embodiment of this application. In the embodiment shown in FIG. 8, a determining basis of the radar system is wavelengths and delays of the N first signals. Based on the embodiment shown in FIG. 3, the following describes the components in the radar system with reference to FIG. 8.

As shown in FIG. 8, the transmitting assembly 101 includes a laser, a frequency multiplication crystal group, an optical fiber coupler, a first optical fiber, a signal separation assembly, a circulator, a delayer group, a fiber collimator, a beam splitter, a reflector, a neutral density filter, a first detector, a right-angle prism, and a scanner.

It should be noted that, for descriptions of the laser, the frequency multiplication crystal group, the fiber collimator, the beam splitter, the reflector, the neutral density filter, the first detector, the right-angle prism, and the scanner that are included in the transmitting assembly 101 shown in the embodiment in FIG. 8, refer to the embodiment in FIG. 4. Details are not described herein again. When the frequency multiplication crystal group includes N−1 frequency multiplication crystals, N−1 optical signals are transmitted from the frequency multiplication crystal group, and the laser further transmits an optical signal to the first optical fiber coupler.

It should be noted that, for a delayer group included in the transmitting assembly shown in the embodiment in FIG. 8, refer to the embodiment shown in FIG. 6. Details are not described herein again.

In the embodiment shown in FIG. 8, N signals obtained after a frequency multiplication crystal assembly converts a third signal transmitted by a laser may be referred to as N fourth signals, and wavelengths of the N fourth signals are different.

After receiving the N fourth signals transmitted by the frequency multiplication crystal group, the first optical fiber coupler may couple the N fourth signals to the first optical fiber. In the first optical fiber, the N fourth signals are coupled as an optical signal beam. The first optical fiber may transmit the N fourth signals to the signal separation assembly. The first optical fiber is disposed, so that the transmitting assembly 101 may be deployed more flexibly.

The signal separation assembly is configured to: separate the N fourth signals, and send the N separated fourth signals to the delayer group. The N separated fourth signals are N optical signal beams. Wavelengths of the N separated fourth signals are different. The signal separation assembly sends the N fourth signals to the circulator.

Optionally, the signal separation assembly may include N−1 grating elements, and each grating element may reflect a signal with one wavelength and a signal with another wavelength other than a reflected signal in a transmitted optical signal. For example, it is assumed that an optical signal transmitted to a grating element includes a signal with X (greater than or equal to 2) wavelengths, the grating element reflects a signal with one wavelength in the optical signal, and transmits a signal with X−1 wavelengths.

It should be noted that, if a quantity of circulators is N−1, and the delayer group includes N−1 delayers, the signal separation assembly may separately send N−1 fourth signals to the N−1 circulators, where the fourth signals are in a one-to-one correspondence with the circulators. For example, the signal separation assembly sends the $i^{th}$ fourth signal to the $i^{th}$ circulator, where i is an integer between 1 and N−1. The $i^{th}$ circulator sends the $i^{th}$ fourth signal to the $i^{th}$ delayer group. The signal separation assembly further sends a fourth signal with one wavelength to the fiber collimator.

Figure 9:
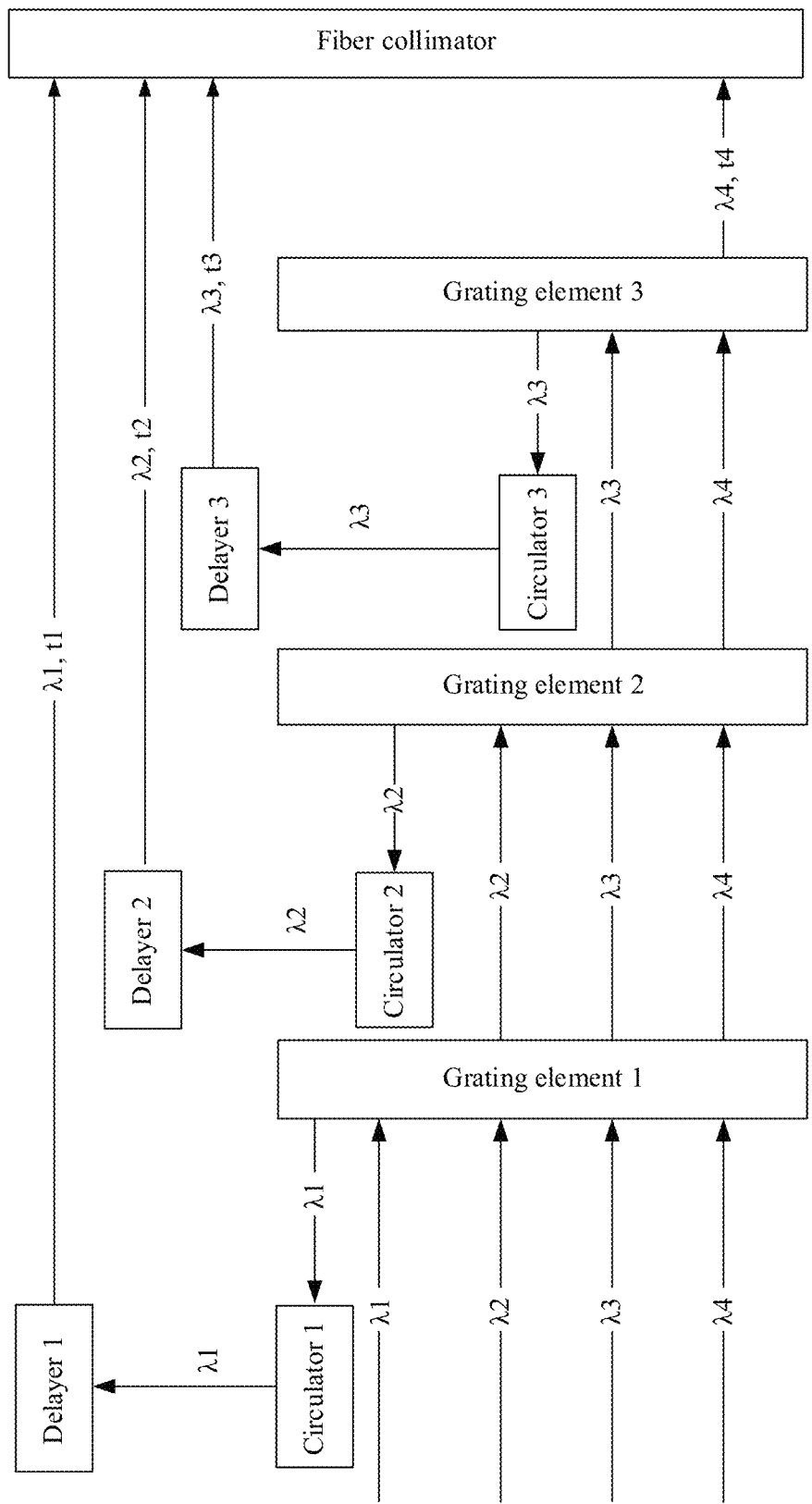
FIG. 9 is a schematic diagram of some components in a transmitting assembly according to an embodiment of this application.

With reference to FIG. 9, the following describes a case in which a quantity of circulators is N−1 and a delayer group includes N−1 delayers.

FIG. 9 is a schematic diagram of some components in a transmitting assembly according to an embodiment of this application. As shown in FIG. 9, for ease of description, for example, N=4, a signal separation assembly includes three grating elements (a grating element 1, a grating element 2, and a grating element 3), there are three circulators (s a circulator 1, a circulator 2, and a circulator 3), and a delayer group includes three delayers (a delayer 1, a delayer 2, and a delayer 3).

As shown in FIG. 9, it is assumed that the N fourth signals (the N fourth signals may be one optical signal beam) emitted from the first optical fiber include signals with four wavelengths, and the four wavelengths are respectively $\lambda_1$, $\lambda_2$, $\lambda_3$, and $\lambda_4$.

After the signals with the four wavelengths arrive at the grating element 1, the grating element 1 reflects the signal with the wavelength of, and transmits the signals with the wavelengths of $\lambda_2$, $\lambda_3$, and $\lambda_4$. The signal with the wavelength of that is reflected by the grating element 1 is transmitted to the circulator 1. The circulator 1 transmits the signal with the wavelength of $\lambda_1$ according to a direction in which the delayer 1 is located. The delayer 1 delays the signal with the wavelength of $\lambda_1$. It is assumed that a delay of the delayed signal is $t_1$, therefore, the wavelength of the signal transmitted by the delayer to the fiber collimator is $\lambda_1$, and the delay of the signal transmitted by the delayer to the fiber collimator is $t_1$.

After the signals that are transmitted by the grating element 1 and whose wavelengths are $\lambda_2$, $\lambda_3$, and $\lambda_4$ arrive at the grating element 2, the grating element 2 reflects the signal with the wavelength of $\lambda_2$, and transmits the signals with the wavelengths of $\lambda_3$ and $\lambda_4$. The signal with the wavelength of $\lambda_2$ reflected by the grating element 2 is transmitted to the circulator 2. The circulator 2 transmits the signal with the wavelength of $\lambda_2$ according to a direction in which the delayer 2 is located. The delayer 2 delays the signal with the wavelength of $\lambda_2$. It is assumed that a delay of the delayed signal is $t_2$, therefore, the wavelength of the signal transmitted by the delayer to the fiber collimator is $\lambda_2$, and the delay of the signal transmitted by the delayer to the fiber collimator is $t_2$.

After the signals that are transmitted by the grating element 2 and whose wavelengths are $\lambda_3$ and $\lambda_4$ arrive at the grating element 3, the grating element 3 reflects the signal with the wavelength of $\lambda_3$, and transmits the signal with the wavelength of $\lambda_4$. The signal with the wavelength of $\lambda_3$ reflected by the grating element 3 is transmitted to the circulator 3. The circulator 3 transmits the signal with the wavelength of $\lambda_3$ according to a direction in which the delayer 3 is located. The delayer 3 delays the signal with the wavelength of $\lambda_3$. It is assumed that a delay of the delayed signal is $\lambda_3$, therefore, the wavelength of the signal trans-mitted by the delayer to the fiber collimator is $\lambda_3$, and the delay of the signal transmitted by the delayer to the fiber collimator is $t_3$.

The signal that is transmitted by the grating element 3 and whose wavelength is $\lambda_4$ is transmitted to the fiber collimator. It is assumed that a delay of the signal is $t_4$, the wavelength of the signal transmitted by the delayer to the fiber collimator is $\lambda_4$, and the time delay of the signal transmitted by the delayer to the fiber collimator is $t_4$.

It can be learned from the foregoing descriptions that the fiber collimator receives the four signals, and the four signals are respectively the signal whose wavelength is $\lambda_1$ and delay is $t_1$, the signal whose wavelength is $\lambda_2$ and delay is $t_2$, the signal whose wavelength is $\lambda_2$ and delay is $t_2$, and the signal whose wavelength is $\lambda_4$ and delay is $t_4$.

It should be noted that, for the telescope, the second optical fiber, the wavelength division multiplexer, and the second detector included in the receiving assembly 102 shown in the embodiment in FIG. 8, refer to the description in the embodiment in FIG. 4. Details are not described herein again.

After receiving a second electrical signal, the controller may determine, based on N wavelengths of N first signals and the second electrical signal, whether a second signal includes an echo signal corresponding to the first signal. Optionally, the controller may determine, by using the following step 1 to step 3, whether the second signal includes the echo signal corresponding to the first signal:

Step 1: Perform noise reduction processing on the second electrical signal.

Noise reduction processing may be performed on the second electrical signal through a preset filter, so as to eliminate impact of environmental noise on an echo signal.

Step 2: Obtain peak strengths and peak moments of the N second electrical signals.

Peak strengths of the N second electrical signals may be obtained by using a waveform fitting algorithm.

Step 3: If the N second electrical signals meet the condition a, the condition b, and the condition c, determine that the second signal includes an echo component corresponding to the first signal.

Condition a: The N second electrical signals include N wavelength components.

Condition b: Delays between N peak moments meet a preset delay.

Condition c: Peak strengths of the N second electrical signals are all greater than a preset strength.

In the condition a, if the N second electrical signals include N wavelength components, the second signal includes signals with N wavelengths. In the condition b, if the delays between the N peak moments meet the preset delay, peak moments of signals with N delays included in the second signal meet the preset delay. In the condition c, if the peak strengths of the N second electrical signals are greater than the preset strength, strength of signals with N wavelengths included in the second signal is greater than the preset threshold.

When the controller determines that the second signal includes the echo component corresponding to the first signal, the controller may determine the echo component in the second signal and measure an object based on the echo component and the first electrical signal. When ranging is performed on the object, strength and distances of the N second electrical signals may be calculated based on a time-of-flight principle, and superimposition averaging processing is performed, so as to increase a signal-to-noise ratio of the ranging.

In the radar system shown in FIG. 8, a transmit signal transmitted by the transmitting assembly includes N (N is an integer greater than 1) first signals, and wavelengths and delays of the N first signals are different. The controller may determine, based on a characteristic of the transmit signal (wavelengths and delays of the N first signals are different), an echo signal in a signal received by the receiving assembly. A characteristic of the echo signal is the same as the characteristic of the transmit signal. Therefore, the controller can accurately determine, based on the characteristic of the transmit signal, the echo signal in the signal received by the receiving assembly. This improves object measurement accuracy.

The following describes the radar system shown in the embodiment in FIG. 8 by using Example 1 and Example 2.

Example 1: It is assumed that N is 2, the frequency multiplication crystal group includes one frequency multiplication crystal and one circulator, and the delayer group includes one delayer.

It is assumed that a wavelength of a signal transmitted by a laser is 1064 nm (nanometers). A part of the signal transmitted by the laser is transmitted to the first optical fiber coupler, and the other part is transmitted to the frequency multiplication crystal. The frequency multiplication crystal processes the signal, and a wavelength of the processed signal is 532 nm. The signal processed by the frequency multiplication crystal is sent to the first optical fiber coupler. The first optical fiber coupler couples the signals with two wavelengths to the first optical fiber, and transmits the signals with two wavelengths to the signal separation assembly through the first optical fiber. The signal separation assembly may obtain the signals with two wavelengths through separation. The signal separation assembly may transmit the signal with the wavelength of 1064 nm to the fiber collimator, and transmit the signal with the wavelength of 532 nm to a circulator. The circulator determines, based on a location of a delayer, that the signal with the wavelength of 532 nm is transmitted to the delayer. After delaying the signal by 30 ns, the delayer transmits the delayed signal to the fiber collimator.

The fiber collimator receives signals with the wavelength of 1064 nm and the wavelength of 532 nm, and a delay difference between the two signals is 30 nm. The fiber collimator transmits the signals with two wavelengths, and the signals with two wavelengths arrive at the scanner through the beam splitter and the right-angle prism. The scanner transmits the signals with two wavelengths, and a delay difference between the signals with two wavelengths is 30 nm.

Amplitudes of the signals with two wavelengths may be set to be different. This improves accuracy of determining the echo signal. The following describes a process of determining an echo signal with reference to FIG. 10A to FIG. 10C.

Figure 10A:
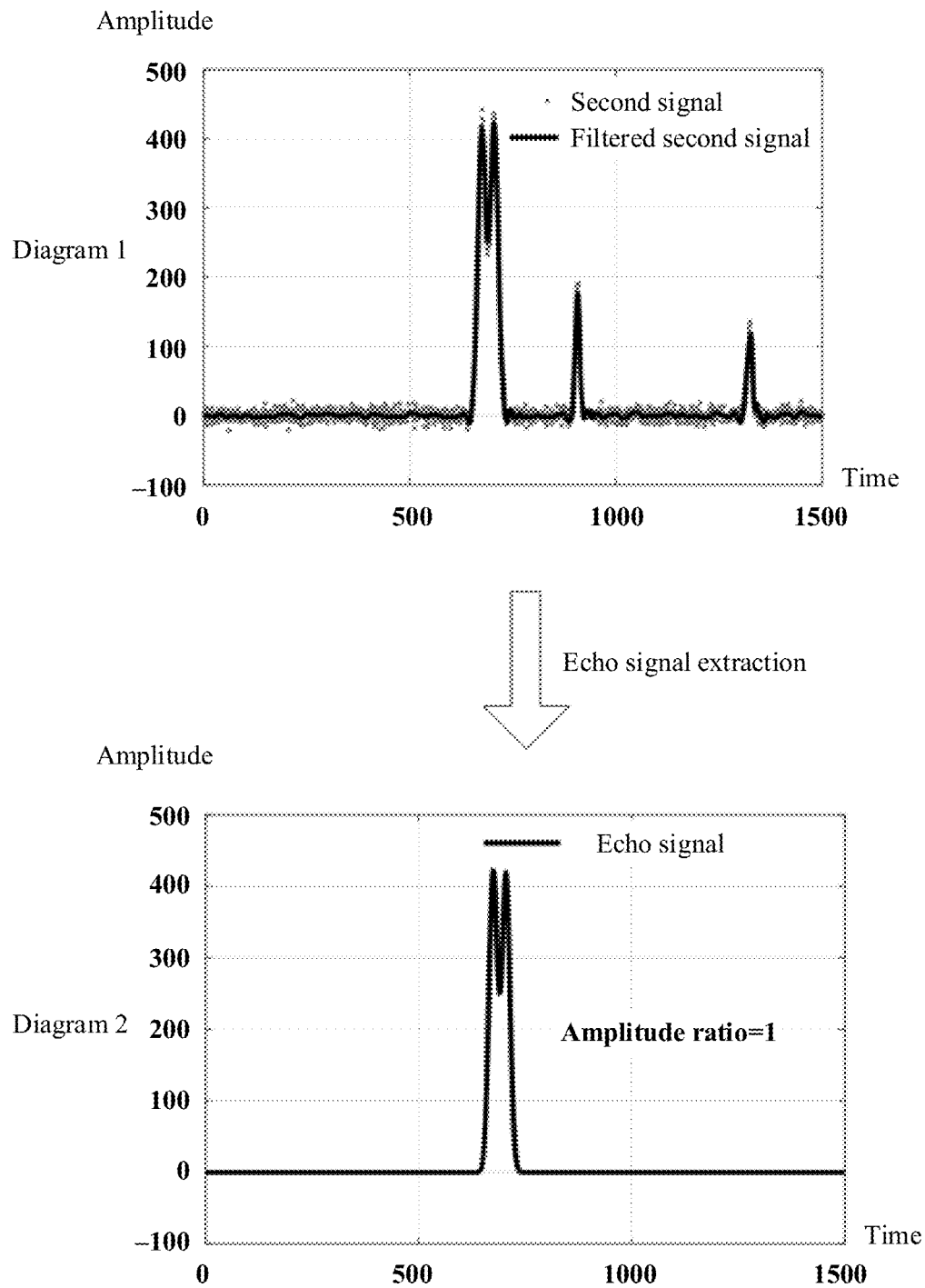
FIG. 10A is a schematic diagram of determining an echo signal according to an embodiment of this application.

FIG. 10A is a schematic diagram of determining an echo signal according to an embodiment of this application. In this example, an amplitude ratio of a signal with a wavelength of 1064 nm to a signal with a wavelength of 532 nm is 1:1. FIG. 10A includes Diagram 1 and Diagram 2.

Diagram 1 includes three second signals and a filtered second signal. Signals corresponding to three pulses in Diagram 1 may be separately referred to as one second signal. The controller separately determines, based on the three determining conditions (the condition a, the condition b, and the condition c) and the amplitude ratio in the embodiment in FIG. 8, whether the three second signals are echo signals.

For the $1^{st}$ second signal, the second signal includes signals with two wavelengths, a delay difference between the signals with two wavelengths is 30 nm, amplitudes of the signals with two wavelengths are both greater than a preset threshold, and an amplitude ratio between the signals with two wavelengths is 1:1. Therefore, it may be determined that the second signal is an echo signal.

For the $2^{nd}$ second signal and the $3^{rd}$ second signal, neither of the two second signals may simultaneously meet the three determining conditions (the condition a, the condition b, and the condition c) in the embodiment in FIG. 8. Therefore, neither of the two second signals is an echo signal.

As shown in Diagram 2, because the $1^{st}$ second signal is an echo signal, and neither the $2^{nd}$ second signal nor the $3^{rd}$ second signal is an echo signal, the echo signal determined from the foregoing three second signals is shown in Diagram 2.

Figure 10B:
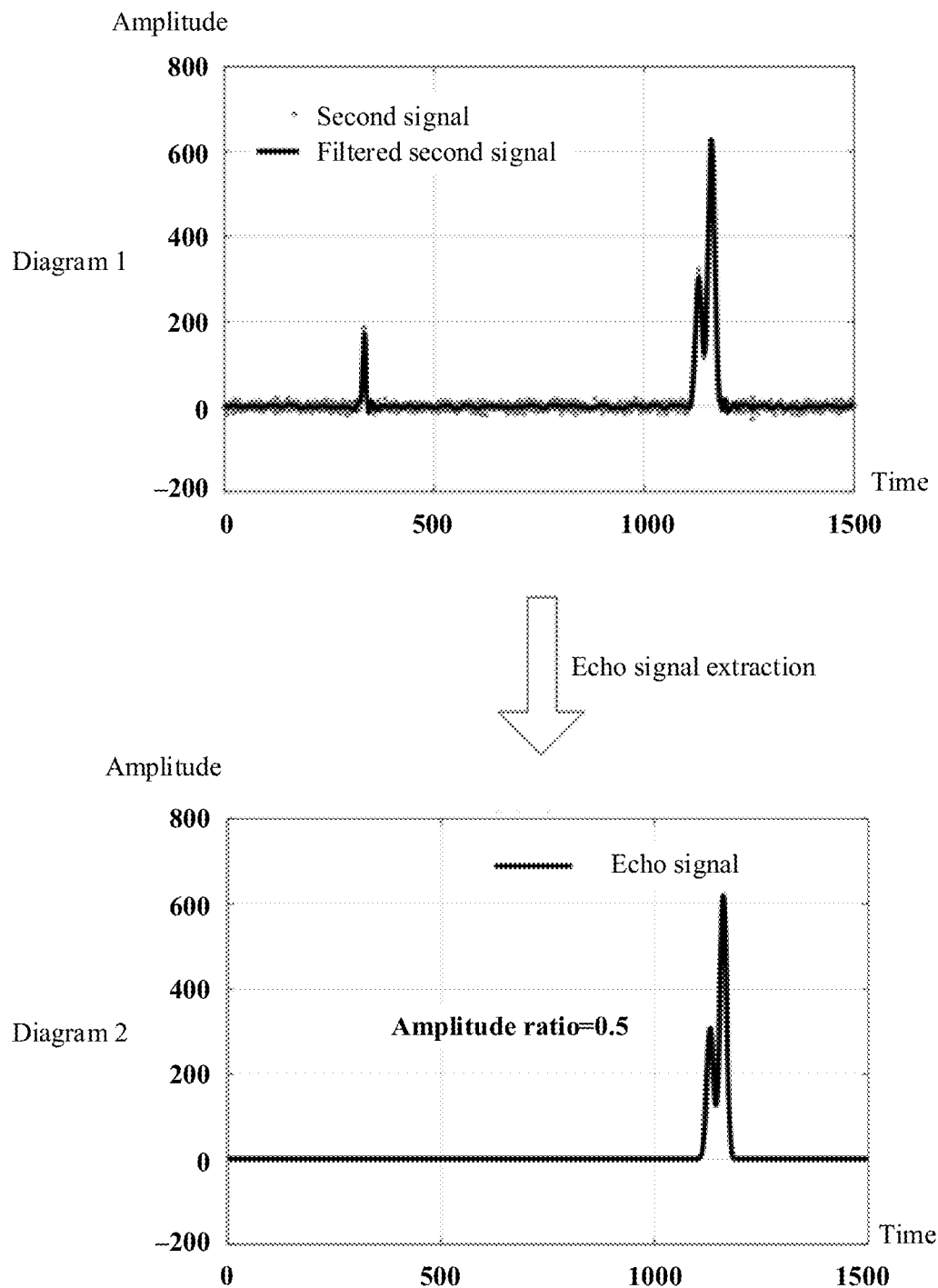
FIG. 10B is another schematic diagram of determining an echo signal according to an embodiment of this application.

FIG. 10B is another schematic diagram of determining an echo signal according to an embodiment of this application. In this example, an amplitude ratio of a signal with a wavelength of 1064 nm to a signal with a wavelength of 532 nm is 1:2. FIG. 10B includes Diagram 1 and Diagram 2.

Diagram 1 includes two second signals and a filtered second signal. Signals corresponding to two pulses in Diagram 1 may be separately referred to as one second signal. The controller separately determines, based on the three determining conditions (the condition a, the condition b, and the condition c) and the amplitude ratio in the embodiment in FIG. 8, whether the two second signals are echo signals.

For the $1^{st}$ second signal, the second signal cannot simultaneously meet the three determining conditions (the condition a, the condition b, and the condition c) in the embodiment in FIG. 8. Therefore, the second signal is not an echo signal.

For the $2^{nd}$ second signal, the second signal includes signals with two wavelengths, a delay difference between the signals with two wavelengths is 30 nm, amplitudes of the signals with two wavelengths are both greater than a preset threshold, and an amplitude ratio between the signals with two wavelengths is 1:2. Therefore, it may be determined that the second signal is an echo signal.

As shown in Diagram 2, because the $2^{nd}$ second signal is an echo signal, and the $1^{st}$ second signal is not an echo signal, the echo signal determined from the foregoing two second signals is shown in Diagram 2.

Figure 10C:
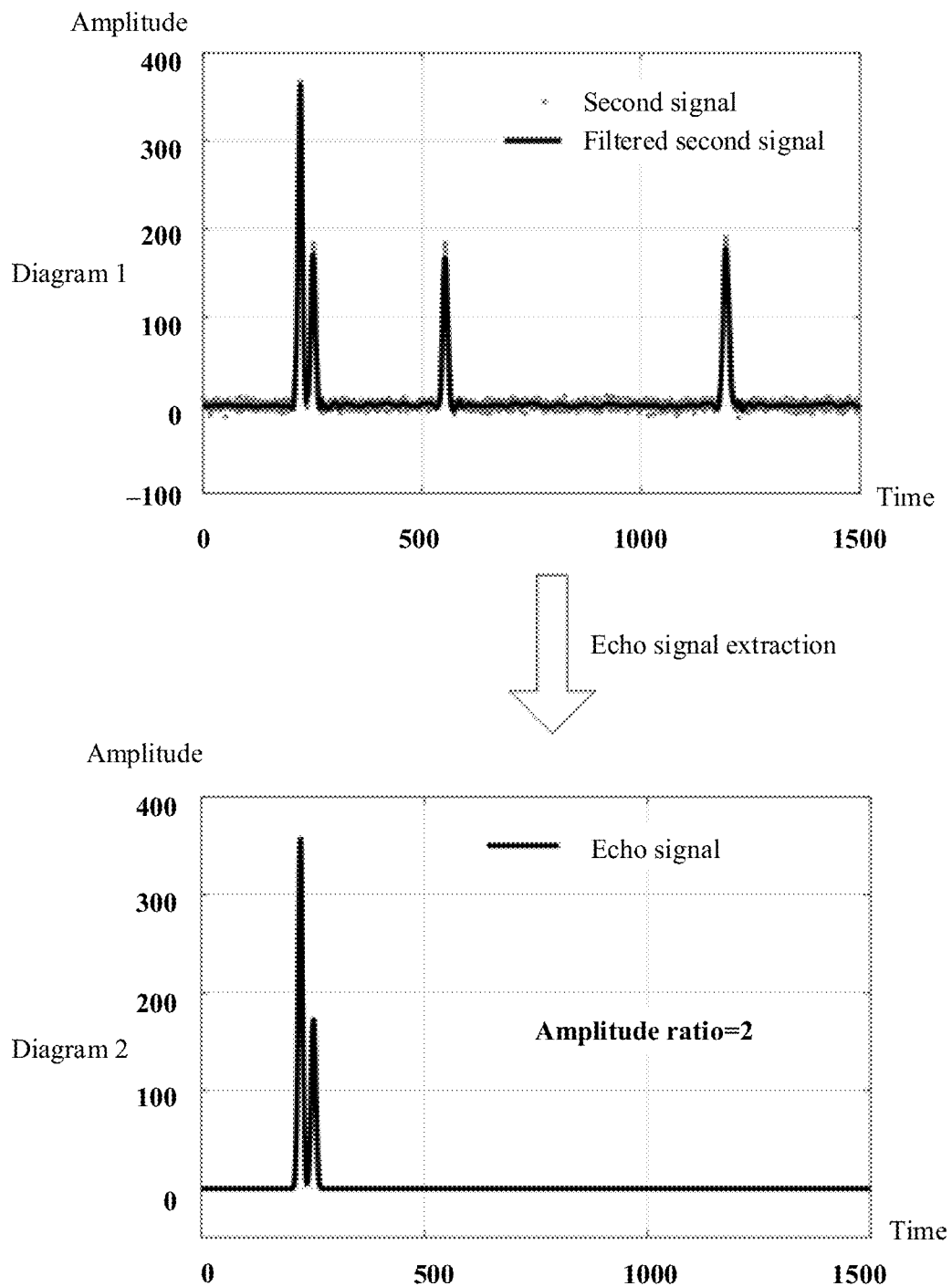
FIG. 10C is still another schematic diagram of determining an echo signal according to an embodiment of this application.

FIG. 10C is still another schematic diagram of determining an echo signal according to an embodiment of this application. In this example, an amplitude ratio of a signal with a wavelength of 1064 nm to a signal with a wavelength of 532 nm is 2:1. FIG. 10A includes Diagram 1 and Diagram 2.

Diagram 1 includes three second signals and a filtered second signal. Signals corresponding to three pulses in Diagram 1 may be separately referred to as one second signal. The controller separately determines, based on the three determining conditions (the condition a, the condition b, and the condition c) and the amplitude ratio in the embodiment in FIG. 8, whether the three second signals are echo signals.

For the $1^{st}$ second signal, the second signal includes signals with two wavelengths, a delay difference between the signals with two wavelengths is 30 nm, amplitudes of the signals with two wavelengths are both greater than a preset threshold, and an amplitude ratio between the signals with two wavelengths is 2:1. Therefore, it may be determined that the second signal is an echo signal.

For the $2^{nd}$ second signal and the $3^{rd}$ second signal, neither of the two second signals may simultaneously meet the three determining conditions (the condition a, the condition b, and the condition c) in the embodiment in FIG. 8. Therefore, neither of the two second signals is an echo signal.

As shown in Diagram 2, because the $1^{st}$ second signal is an echo signal, and neither the $2^{nd}$ second signal nor the $3^{rd}$ second signal is an echo signal, the echo signal determined from the foregoing three second signals is shown in Diagram 2.

In an actual application process, when amplitude ratios of the N first signals are different, probabilities of successfully extracting an echo signal are also different. The following uses an example in which N is 2 to describe an echo signal extraction success rate when the amplitude ratios are different with reference to Table 1.

TABLE 1

| Amplitude ratio | Number of successful extractions | Number of extraction failures | Success rate |
| --- | --- | --- | --- |
| 1 | 882 | 118 | 88.2% |
| 1:2 | 745 | 155 | 74.5% |
| 2:1 | 754 | 246 | 75.4% |

Refer to Table 1. When the amplitude ratio of two first signals is 1, the echo signal extraction success rate is high. It should be noted that Table 1 merely shows data obtained in an experiment, and does not limit the success rate. When a test environment changes, the preceding success rate may change.

Example 2: It is assumed that N is 2, the frequency multiplication crystal group includes one frequency multiplication crystal and one circulator, and the delayer group includes one delayer.

It is assumed that a wavelength of a signal transmitted by a laser is 1064 nm (nanometers). A part of the signal transmitted by the laser is transmitted to the first optical fiber coupler, and the other part is transmitted to the frequency multiplication crystal. The frequency multiplication crystal processes the signal, and a wavelength of the processed signal is 532 nm. The signal processed by the frequency multiplication crystal is sent to the first optical fiber coupler. The first optical fiber coupler couples the signals with two wavelengths to the first optical fiber, and transmits the signals with two wavelengths to the signal separation assembly through the first optical fiber. The signal separation assembly may obtain the signals with two wavelengths through separation. The signal separation assembly may transmit the signal with the wavelength of 1064 nm to the fiber collimator, and transmit the signal with the wavelength of 532 nm to a circulator. The circulator determines, based on a location of a delayer, that the signal with the wavelength of 532 nm is transmitted to the delayer. After delaying the signal, the delayer transmits the delayed signal to the fiber collimator.

The fiber collimator receives signals with the wavelength of 1064 nm and the wavelength of 532 nm, and a delay difference exists between the two signals. The fiber collimator transmits the signals with two wavelengths, and the signals with two wavelengths arrive at the scanner through the beam splitter and the right-angle prism. The scanner transmits the signals with two wavelengths.

In an actual application process, an echo signal extraction success rate by the controller may be different due to different delays of the delayer on the signal. The following describes a process of determining an echo signal with reference to FIG. 11A to FIG. 11D.

Figure 11A:
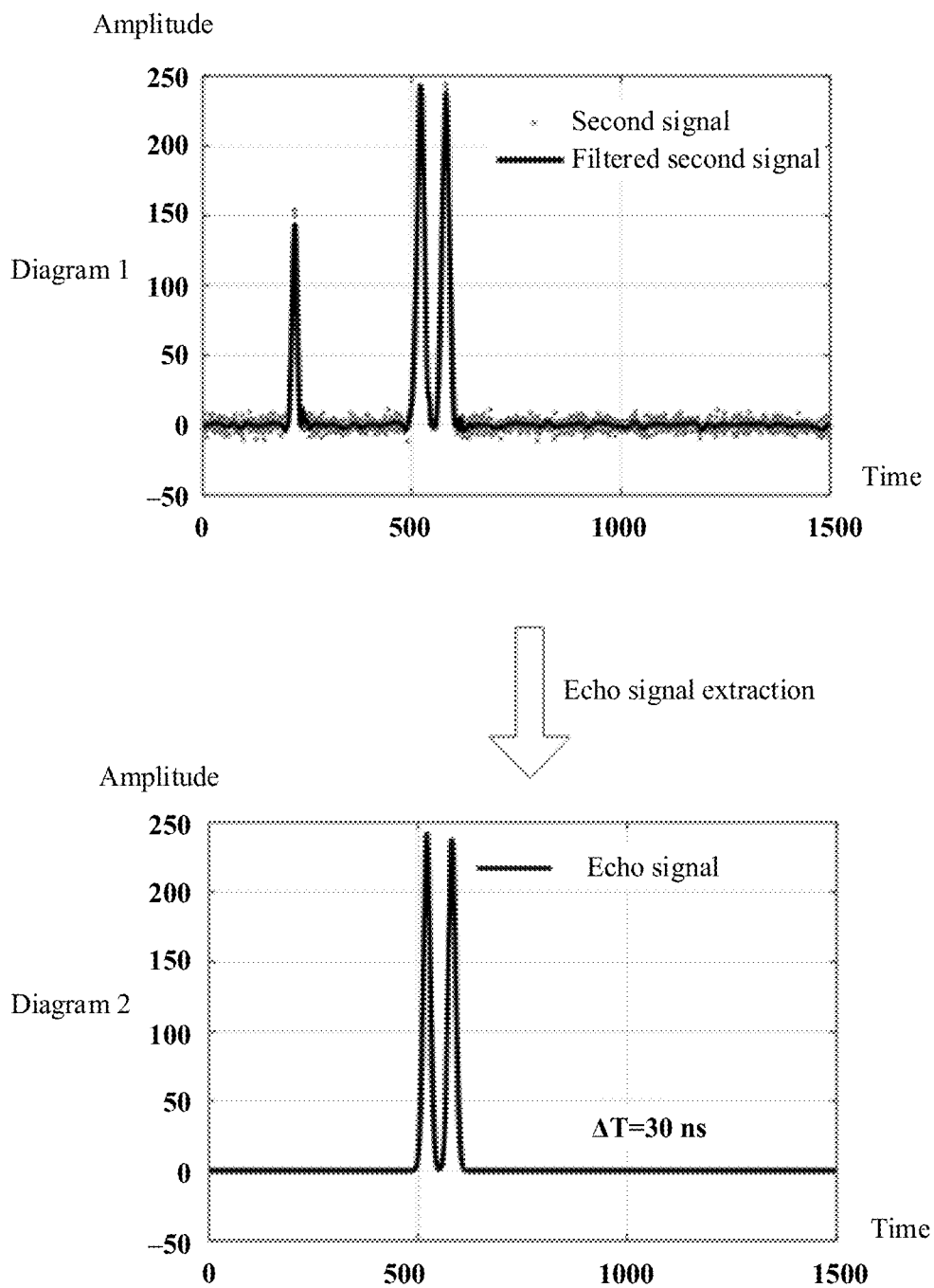
FIG. 11A is a yet another schematic diagram of determining an echo signal according to an embodiment of this application.

FIG. 11A is a yet another schematic diagram of determining an echo signal according to an embodiment of this application. In this example, half-wavelength widths of signals with two wavelengths are both 10 ns (nanoseconds), and a delay difference between the two wavelengths is 30 ns. FIG. 10A includes Diagram 1 and Diagram 2.

Diagram 1 includes two second signals and a filtered second signal. Signals corresponding to two pulses in Diagram 1 may be separately referred to as one second signal. The controller separately determines, based on the three determining conditions (the condition a, the condition b, and the condition c) in the embodiment in FIG. 8, whether the two second signals are echo signals.

For the $1^{st}$ second signal, the second signal cannot simultaneously meet the three determining conditions (the condition a, the condition b, and the condition c) in the embodiment in FIG. 8. Therefore, the second signal is not an echo signal.

For the $2^{nd}$ second signal, the second signal includes signals with two wavelengths, a delay difference between the signals with two wavelengths is 30 nm, and amplitudes of the signals with two wavelengths are both greater than a preset threshold. Therefore, it may be determined that the second signal is an echo signal.

As shown in Diagram 2, because the $2^{nd}$ second signal is an echo signal, and the $1^{st}$ second signal is not an echo signal, the echo signal determined from the foregoing two second signals is shown in Diagram 2.

Figure 11B:
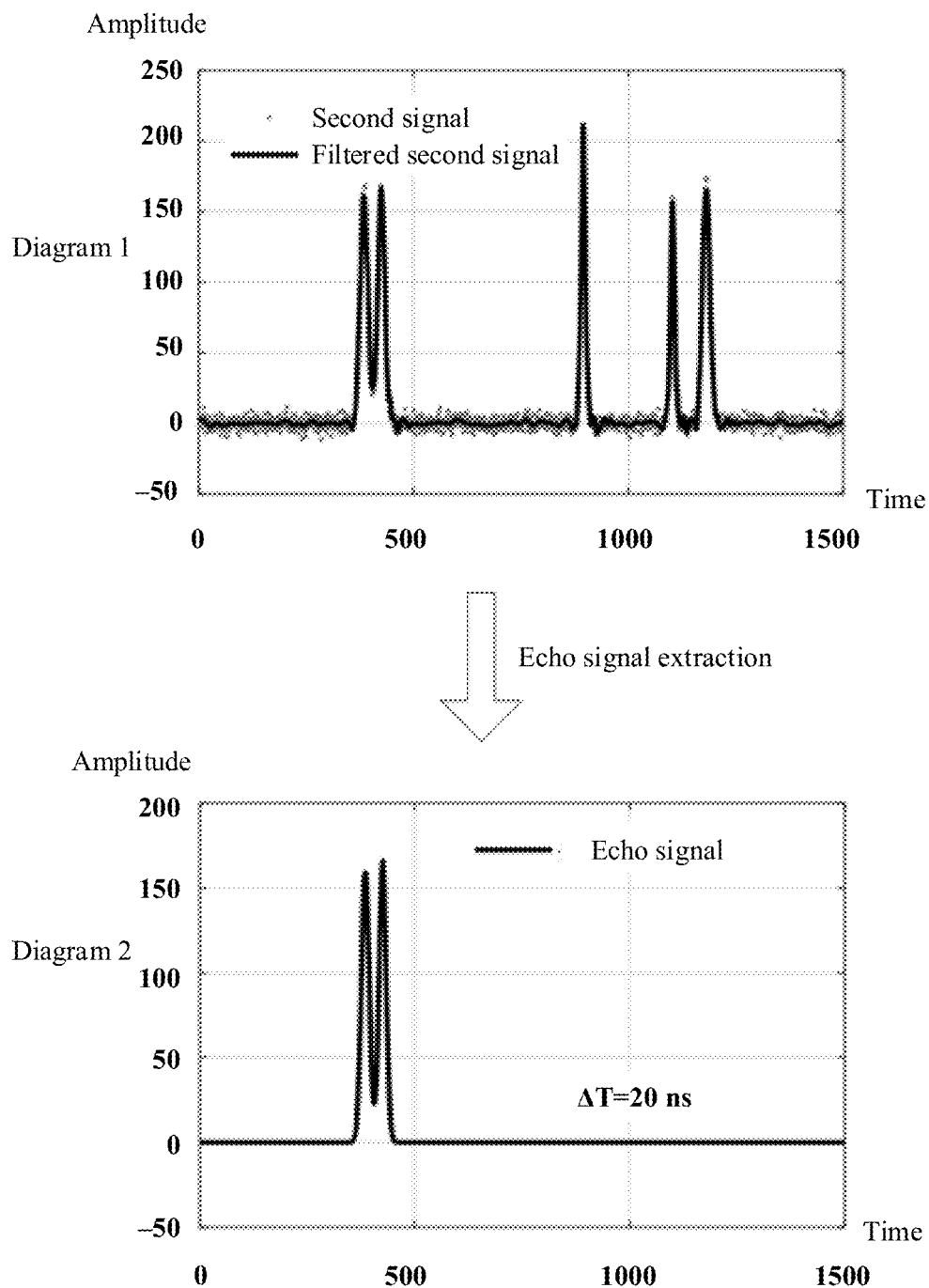
FIG. 11B is a still yet another schematic diagram of determining an echo signal according to an embodiment of this application.

FIG. 11B is a still yet another schematic diagram of determining an echo signal according to an embodiment of this application. In this example, half-wavelength widths of signals with two wavelengths are both 10 ns (nanoseconds), and a delay difference between the two wavelengths is 20 ns. FIG. 11B includes Diagram 1 and Diagram 2.

Diagram 1 includes three second signals and a filtered second signal. Signals corresponding to three pulses in Diagram 1 may be separately referred to as one second signal. The controller separately determines, based on the three determining conditions (the condition a, the condition b, and the condition c) in the embodiment in FIG. 8, whether the three second signals are echo signals.

For the $1^{st}$ second signal, the second signal includes signals with two wavelengths, a delay difference between the signals with two wavelengths is 20 nm, and amplitudes of the signals with two wavelengths are both greater than a preset threshold. Therefore, it may be determined that the second signal is an echo signal.

For the 2nd second signal and the $3^{rd}$ second signal, neither of the two second signals may simultaneously meet the three determining conditions (the condition a, the condition b, and the condition c) in the embodiment in FIG. 8. Therefore, neither of the two second signals is an echo signal.

As shown in Diagram 2, because the $1^{st}$ second signal is an echo signal, and neither the $2^{nd}$ second signal nor the $3^{rd}$ second signal is an echo signal, the echo signal determined from the foregoing three second signals is shown in Diagram 2.

Figure 11C:
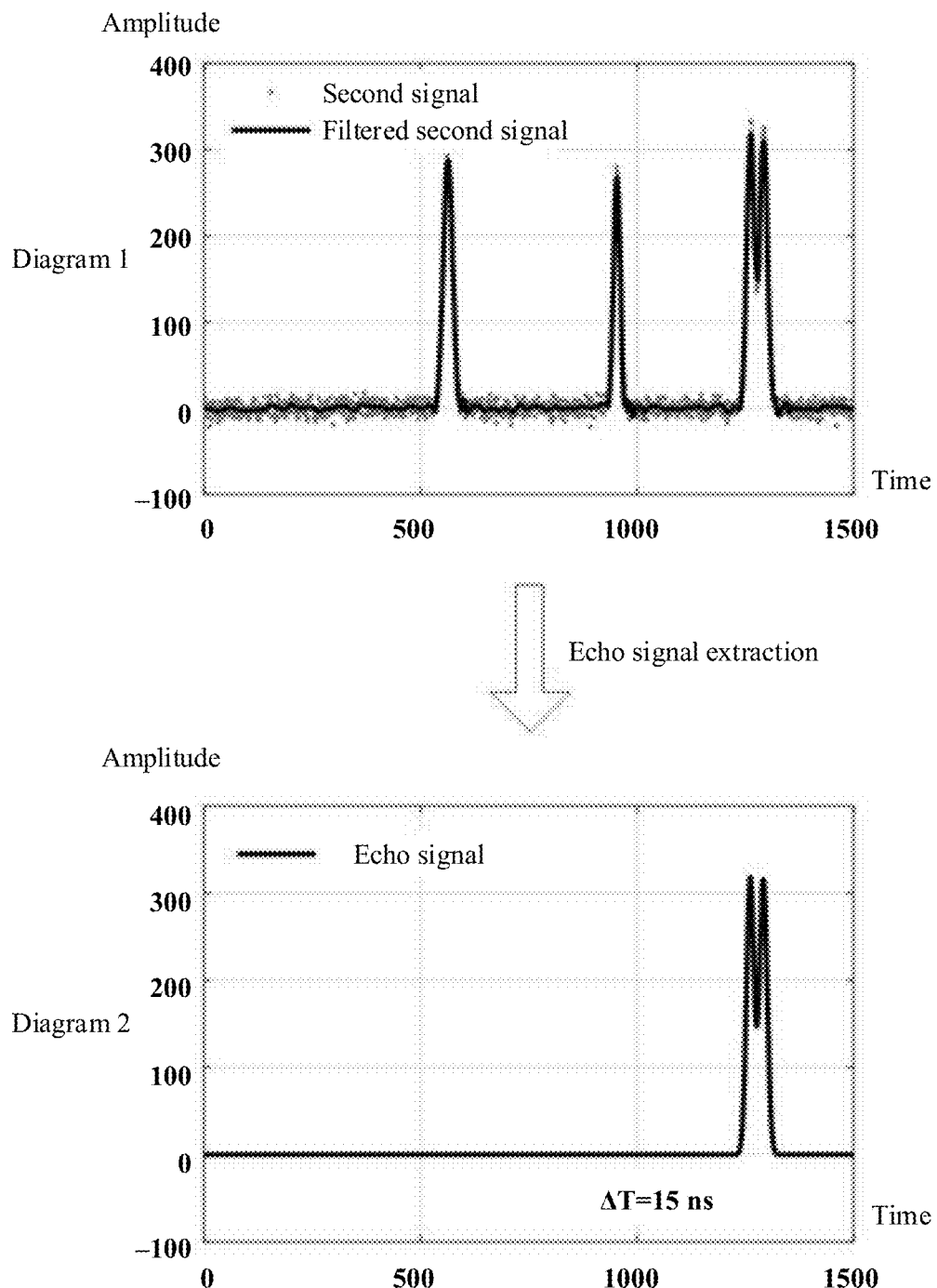
FIG. 11C is a further schematic diagram of determining an echo signal according to an embodiment of this application.

FIG. 11C is a further schematic diagram of determining an echo signal according to an embodiment of this application. In this example, half-wavelength widths of signals with two wavelengths are both 10 ns (nanoseconds), and a delay difference between the two wavelengths is 15 ns. FIG. 11C includes Diagram 1 and Diagram 2.

Diagram 1 includes three second signals and a filtered second signal. Signals corresponding to three pulses in Diagram 1 may be separately referred to as one second signal. The controller separately determines, based on the three determining conditions (the condition a, the condition b, and the condition c) in the embodiment in FIG. 8, whether the three second signals are echo signals.

For the 1$^{st}$ second signal and the 2$^{nd}$ second signal, neither of the two second signals may simultaneously meet the three determining conditions (the condition a, the condition b, and the condition c) in the embodiment in FIG. 8. Therefore, neither of the two second signals is an echo signal.

For the 3$^{rd}$ second signal, the second signal includes signals with two wavelengths, a delay difference between the signals with two wavelengths is 15 nm, and amplitudes of the signals with two wavelengths are both greater than a preset threshold. Therefore, it may be determined that the second signal is an echo signal.

As shown in Diagram 2, because the 3$^{rd}$ second signal is an echo signal, and neither the 1$^{st}$ signal second signal nor the 2$^{nd}$ second signal is an echo signal, the echo signal determined from the foregoing three second signals is shown in Diagram 2.

Figure 11D:
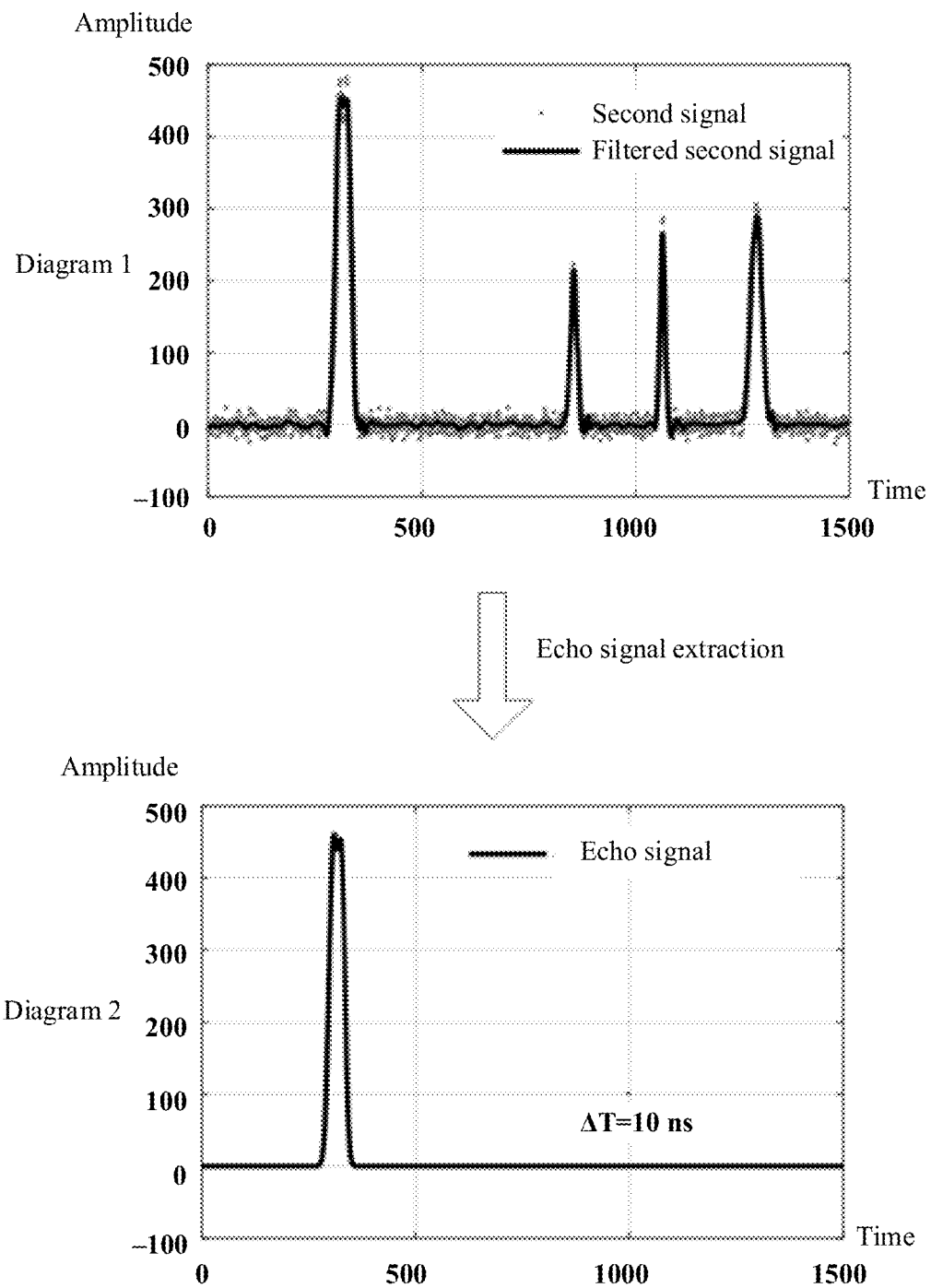
FIG. 11D is a still further schematic diagram of determining an echo signal according to an embodiment of this application.

FIG. 11D is a still further schematic diagram of determining an echo signal according to an embodiment of this application. In this example, half-wavelength widths of signals with two wavelengths are both 10 ns (nanoseconds), and a delay difference between the two wavelengths is 10 ns. FIG. 11D includes Diagram 1 and Diagram 2.

Diagram 1 includes four second signals and a filtered second signal. Signals corresponding to four pulses in Diagram 1 may be separately referred to as one second signal. The controller separately determines, based on the three determining conditions (the condition a, the condition b, and the condition c) in the embodiment in FIG. 8, whether the four second signals are echo signals.

For the 1$^{st}$ second signal, the second signal includes signals with two wavelengths, a delay difference between the signals with two wavelengths is 15 nm, and amplitudes of the signals with two wavelengths are both greater than a preset threshold. Therefore, it may be determined that the second signal is an echo signal.

For the 2$^{nd}$ second signal to the 4$^{th}$ second signal, none of the three second signals may simultaneously meet the three determining conditions (the condition a, the condition b, and the condition c) in the embodiment in FIG. 8. Therefore, none of the three second signals is an echo signal.

As shown in Diagram 2, because the 1$^{st}$ second signal is an echo signal, and the 2$^{nd}$ second signal to the 4$^{th}$ second signal are not echo signals, the echo signal determined from the foregoing four second signals is shown in Diagram 2.

In an actual application process, when time intervals (delay differences) between the N first signals are different, probabilities of successfully extracting an echo signal are also different. The following uses an example in which N is 2 to describe echo signal extraction success rates at different time intervals with reference to Table 2.

TABLE 2

| Time interval | Number of successful extractions | Number of extraction failures | Success rate |
|---|---|---|---|
| 30 | 913 | 87 | 91.3% |
| 20 | 908 | 92 | 90.8% |
| 15 | 949 | 51 | 94.9% |
| 10 | 498 | 502 | 49.8% |

Refer to Table 2. When half-wavelength widths of two first signals are 10 ns, and the time interval between the two first signals is 15 ns, the echo signal extraction success rate is high. It should be noted that Table 2 merely shows data obtained in an experiment, and does not limit the success rate. When a test environment changes, the preceding success rate may change.

It can be learned from the foregoing Example 1 and Example 2 that the echo signal can be accurately extracted by using the radar system shown in this application.

Figure 12:
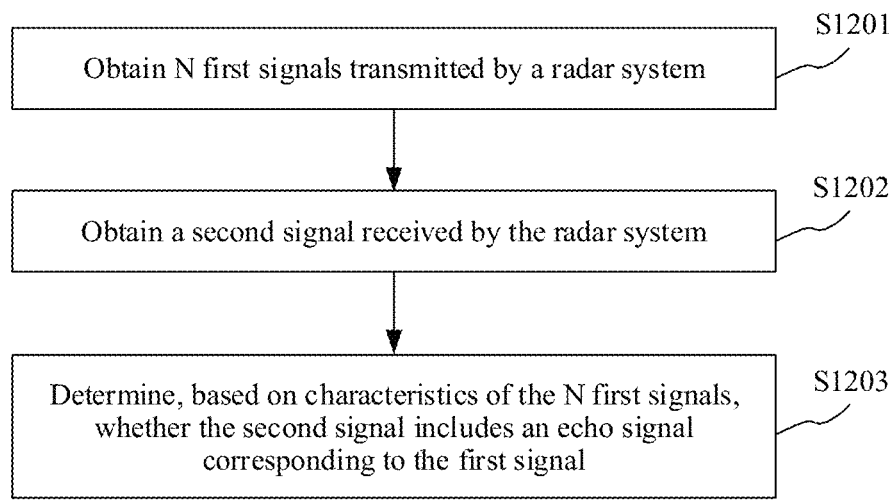
FIG. 12 is a schematic flowchart of a signal processing method according to an embodiment of this application.

The following describes a signal processing process of a radar system with reference to an embodiment shown in FIG. 12.

FIG. 12 is a schematic flowchart of a signal processing method according to an embodiment of this application. As shown in FIG. 12, the method may include the following steps.

S1201. Obtain N first signals transmitted by a radar system.

This embodiment of this application may be executed by a controller in the radar system or an information processing apparatus in the controller. Optionally, the image processing apparatus may be implemented by software, or may be implemented by a combination of software and hardware.

Characteristics of the N first signals are different, the characteristic includes a wavelength and/or a delay, and N is an integer greater than 1.

It should be noted that the N first signals may be transmitted by a transmitting assembly in the radar system shown in any one of the foregoing embodiments. For the transmitting assembly and the N first signals, refer to the description of any one of the foregoing embodiments. Details are not described herein again.

S1202. Obtain a second signal received by the radar system.

It should be noted that the receiving assembly in the radar system may receive the second signal, and the controller obtains the second signal from the receiving assembly. For the receiving assembly and the second signal, refer to the description in any one of the foregoing embodiments. Details are not described herein again.

S1203. Determine, based on the characteristics of the N first signals, whether the second signal includes an echo signal corresponding to the first signal.

When wavelengths of the N first signals are different, whether the second signal includes the echo signal corresponding to the first signal may be determined in the following manner: when the second signal includes signals with N wavelengths and strength of each of the signals with N wavelengths is greater than a preset threshold, determining that the second signal includes the echo signal.

When delays of the N first signals are different, whether the second signal includes the echo signal corresponding to the first signal may be determined in the following manner: when the second signal includes signals with N delays, a delay between peak moments of the signals with N delays meets a preset delay, and strength corresponding to each of peaks of the signals with N delays is greater than a preset threshold, determining that the second signal includes the echo signal.

When wavelengths and delays of the N first signals are different, whether the second signal includes the echo signal corresponding to the first signal may be determined in the following manner: when the second signal includes signals with N wavelengths, different delays exist between the signals with different wavelengths, strength of each of the signals with N wavelengths is greater than a preset threshold, and a delay between peak moments of the signals with N wavelengths meets a preset delay, determining that the second signal includes the echo signal.

It should be noted that for an execution process of S1203, refer to the foregoing embodiments. Details are not described herein again.

The following describes, by using a specific example, in the method shown in the embodiment of FIG. 12.

For example, it is assumed that the radar system transmits two first signals, and wavelengths and delays of the two first signals are different. It is assumed that wavelengths of the two first signals are respectively 1064 nm and 532 nm, and a time interval between the two first signals is 30 ns.

It is assumed that after receiving the second signal, the radar system extracts two pulses by using a waveform fitting algorithm. Peaks of the two pulses are respectively Ap1 and Ap2, and peak moments of the two pulses are respectively tp1 and tp2. Whether the two pulses are echo signals is determined based on the following condition a, condition b, and condition c.

Condition a: Two wavelength components are included.

Condition b: A time interval between the peak moment tp1 and the peak moment tp2 meets a preset delay.

Condition c: Strength (amplitude) of both the peaks Ap1 and Ap2 is greater than a preset strength. For example, the preset intensity may be 100 my.

It is assumed that parameters of second signals received in four different time periods (second signals received in different time periods may be referred to as a group of data) are shown in Table 3.

TABLE 3

|  | Channel number | Amplitude (mV) | Location (ns) | Wavelength (nm) |
| --- | --- | --- | --- | --- |
| First group | Channel 1 | 160.94 | 327.09 | 782 |
|  | Channel 2 | 0 | 0 | 0 |
| Second group | Channel 1 | 347.42 | 948.09 | 1064 |
|  | Channel 2 | 349.29 | 978.01 | 532 |
| Third group | Channel 1 | 169.54 | 1285.06 | 1064 |
|  | Channel 2 | 59.01 | 1305.05 | 532 |
| Fourth group | Channel 1 | 467.48 | 1778.67 | 1064 |
|  | Channel 2 | 458.23 | 1794.13 | 532 |

In Table 3, the channel 1 may be a second detector, and the channel 2 may be another second detector.

Refer to the first group of data, because the first group of data includes only a signal with one wavelength, which does not meet the foregoing condition a, the second signal corresponding to the first group of data is not an echo signal.

Refer to the second group of data, because the second group of data simultaneously meets the condition a, the condition b, and the condition c, the second signal corresponding to the second group of data is an echo signal.

Refer to the third group of data, because strength of a signal received by the channel 2 in the third group of data is less than the preset strength, which does not meet the condition c, the second signal corresponding to the third group of data is not an echo signal.

Refer to the fourth group of data, because a time interval between two signals in the fourth group of data is not 30 ns, which does not meet the condition b, the second signal corresponding to the fourth group of data is not an echo signal.

In the embodiment shown in FIG. 12, a transmit signal transmitted by the transmitting assembly includes N (N is an integer greater than 1) first signals, and wavelengths and delays of the N first signals are different. The controller may determine, based on a characteristic of the transmit signal (wavelengths and delays of the N first signals are different), an echo signal in a signal received by the receiving assembly. A characteristic of the echo signal is the same as the characteristic of the transmit signal. Therefore, the controller can accurately determine, based on the characteristic of the transmit signal, the echo signal in the signal received by the receiving assembly. This improves object measurement accuracy.

Figure 13:
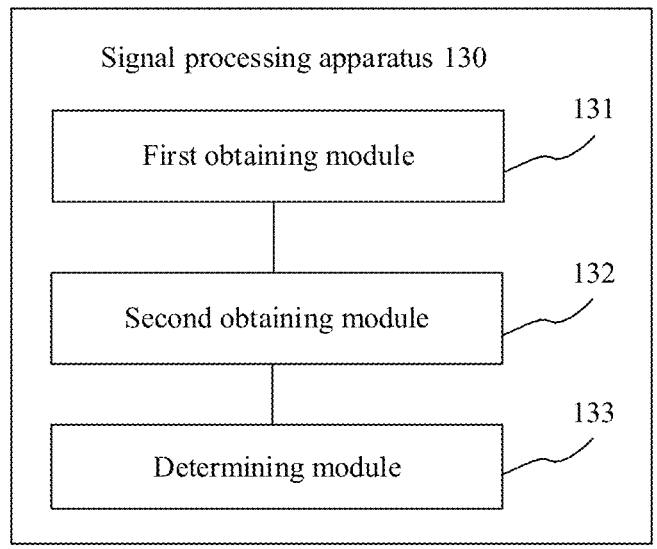
FIG. 13 is a schematic diagram of a structure of a signal processing apparatus according to an embodiment of this application.

FIG. 13 is a schematic diagram of a structure of a signal processing apparatus according to an embodiment of this application. The signal processing apparatus 130 may be a controller in a radar system, or the signal processing apparatus may be a part of a controller. As shown in FIG. 13, the signal processing apparatus 130 may include a first obtaining module 131, a second obtaining module 132, and a determining module 133.

The first obtaining module 131 is configured to obtain N first signals transmitted by the radar system, where characteristics of the N first signals are different, the characteristic includes a wavelength and/or a delay, and N is an integer greater than 1.

The second obtaining module 132 is configured to obtain a second signal received by the radar system.

The determining module 133 is configured to determine, based on the characteristics of the N first signals, whether the second signal includes an echo signal corresponding to the first signal.

Optionally, the first obtaining module 131 may perform step S1201 in the embodiment in FIG. 12.

Optionally, the second obtaining module 132 may perform step S1202 in the embodiment in FIG. 12.

Optionally, the determining module 133 may perform step S1203 in the embodiment in FIG. 12.

It should be noted that the signal processing apparatus shown in embodiments of this application may perform the technical solutions shown in the foregoing method embodiments. Implementation principles and beneficial effects of the signal processing apparatus are similar to those of the technical solutions, and details are not described herein again.

In a possible implementation, the determining module 133 is specifically configured to:

when the second signal includes signals with N wavelengths and strength of each of the signals with N wavelengths is greater than a preset threshold, determine that the second signal includes the echo signal.

In a possible implementation, the determining module 133 is specifically configured to:

when the second signal includes signals with N delays, a delay between peak moments of the signals with N delays meets a preset delay, and strength corresponding to each of peaks of the signals with N delays is greater than a preset threshold, determine that the second signal includes the echo signal.

In a possible implementation, the determining module 133 is specifically configured to:

when the second signal includes signals with N wavelengths, different delays exist between signals with different wavelengths, strength of each of the signals with N wavelengths is greater than a preset threshold, and a delay between peak moments of the signals with N wavelengths meets a preset delay, determine that the second signal includes the echo signal.

It should be noted that the signal processing apparatus shown in embodiments of this application may perform the technical solutions shown in the foregoing method embodiments. Implementation principles and beneficial effects of the signal processing apparatus are similar to those of the technical solutions, and details are not described herein again.

This application provides a readable storage medium, where the readable storage medium stores a computer program, and the computer program is used to implement the signal processing method according to any one of the foregoing embodiments.

An embodiment of this application provides a computer program product. The computer program product includes instructions, and when the instructions are executed, a computer is enabled to perform the foregoing image processing method.

All or some of the steps of the foregoing method embodiments may be implemented by a program instructing related hardware. The foregoing program may be stored in a computer-readable memory. When the program is executed, the steps of the methods in embodiments are performed. The memory (storage medium) includes: a read-only memory (English: read-only memory, ROM for short), a RAM, a flash memory, a hard disk, a solid-state drive, a magnetic tape (English: magnetic tape), a floppy disk (English: floppy disk), an optical disc (English: optical disc), and any combination thereof.

Embodiments of this application are described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processing unit of another programmable data processing device to generate a machine, so that instructions executed by a computer or the processing unit of the another programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

Clearly, a person skilled in the art can make various modifications and variations to embodiments of this application without departing from the spirit and scope of this application. This application is intended to cover these modifications and variations provided that they fall within the scope of protection defined by the following claims and their equivalent technologies. In this application, the term "including" and a variant thereof may refer to non-limitative inclusion; the term "or" and a variant thereof may refer to "and/or". In this application, the terms "first", "second", and the like are intended to distinguish between similar objects but do not necessarily indicate a specific order or sequence. "A plurality of" in this application refers to two or more than two. The term "and/or" describes an association relationship for describing associated objects and represents that three relationships may exist. For example, A and/or B may represent the following three cases: Only A exists, both A and B exist, and only B exists. The character "I" generally indicates an "or" relationship between the associated objects.

What is claimed is:

1. A radar system, comprising a transmitting assembly, a receiving assembly, and a controller, wherein
the transmitting assembly is configured to generate and transmit N first signals, wherein characteristics of the N first signals are different, the characteristic comprises at least one of a wavelength or a delay, and N is an integer greater than 1, wherein the transmitting assembly comprises a laser and a signal processor, wherein the laser is configured to: generate a third signal, and send the third signal to the signal processor; and the signal processor is configured to process the third signal to obtain the N first signals, wherein the signal processor comprises an optical fiber coupler, a first optical fiber, and a signal separation assembly, and the first optical fiber is separately connected to the optical fiber coupler and the signal separation assembly, and wherein
the transmitting assembly comprises at least one of a frequency multiplication crystal group or a delayer group, wherein the frequency multiplication crystal group is configured to convert a signal with a single wavelength into signals with N wavelengths, and the delayer group is configured to convert a signal with a single delay into signals with N delays, wherein the converting a signal with a single wavelength into signals with N wavelengths comprises converting the third signal into N fourth signals, and sending the N fourth signals to the delayer group, wherein wavelengths of the N fourth signals are different; and
the optical fiber coupler is configured to couple the N fourth signals to the first optical fiber, the first optical fiber is configured to transmit the N fourth signals to the signal separation assembly, and the signal separation assembly is configured to: separate the N fourth signals, and send the N separated fourth signals to the delayer group;
the receiving assembly is configured to receive a second signal; and
the controller is configured to determine, based on the characteristics of the N first signals, whether the second signal comprises an echo signal corresponding to the N first signals.

2. The radar system according to claim 1, wherein the converting a signal with a single wavelength into signals with N wavelengths comprises:

converting the third signal into the N first signals, wherein wavelengths of the N first signals are different.

3. The radar system according to claim 2, wherein the frequency multiplication crystal group comprises N−1 frequency multiplication crystals, the N first signals comprise the third signal and signals that are output by the N−1 frequency multiplication crystals, and wavelengths of the signals that are output by the N−1 frequency multiplication crystals are different.

4. The radar system according to claim 1, wherein the converting a signal with a single delay into signals with N delays comprises:

converting the third signal into the N first signals, wherein delays of the N first signals are different.

5. The radar system according to claim 4, wherein the delayer group comprises N−1 delayers, the N first signals comprise the third signal and signals that are output by the N−1 delayers, and delays of the signals that are output by the N−1 delayers are different.

6. The radar system according to claim 1, wherein the converting a signal with a single delay into signals with N delays comprises:

separately performing delay processing on the N fourth signals to obtain the N first signals, wherein wavelengths of the N first signals are different, and delays of the N first signals are different.

7. The radar system according to claim 1, wherein the signal separation assembly comprises N−1 grating elements, the delayer group comprises N−1 delayers, and each grating element is configured to reflect a signal with one wavelength, wherein an $i^{th}$ grating element is configured to: reflect an $i^{th}$ fourth signal, and transmit the $i^{th}$ fourth signal to an $i^{th}$ delayer;

the $i^{th}$ delayer is configured to perform delay processing on the $i^{th}$ fourth signal to obtain an $i^{th}$ first signal, wherein i is a positive integer less than N; and an (N−1)th grating element is further configured to transmit an $N^{th}$ fourth signal to obtain an $N^{th}$ first signal.

8. The radar system according to claim 7, wherein the signal processor further comprises N−1 circulators, and before the transmitting the $i^{th}$ fourth signal to the $i^{th}$ delayer, the $i^{th}$ grating element is further configured to transmit the $i^{th}$ fourth signal to an $i^{th}$ circulator, and the $i^{th}$ circulator is configured to transmit the $i^{th}$ fourth signal in a preset direction; and correspondingly, the transmitting the $i^{th}$ fourth signal to the $i^{th}$ delayer comprises:

transmitting, to the $i^{th}$ delayer, the $i^{th}$ fourth signal that is output by the $i^{th}$ circulator.

9. The radar system according to claim 1, wherein the transmitting assembly further comprises a fiber collimator, a beam splitter, a first detector, and a scanner, wherein the fiber collimator is configured to transmit the N first signals to the beam splitter;

the beam splitter is configured to: transmit the N first signals to the scanner based on first energy, and transmit the N first signals to the first detector based on second energy, wherein a ratio of the first energy to the second energy is a preset ratio;

the scanner is configured to transmit the N received first signals;

the first detector is configured to: convert the N received first signals into a first electrical signal, and send the first electrical signal to the controller; and the controller is further configured to: when the second signal is an echo signal, perform at least one of the following processing based on the second signal and the first electrical signal: speed measurement, distance measurement, or positioning.

10. The radar system according to claim 9, wherein the controller is further configured to: generate a scan control signal, and send the scan control signal to the scanner, wherein the scan control signal is used to control an angle at which the scanner transmits a signal.

11. The radar system according to claim 10, wherein the transmitting the N first signals comprises:

transmitting the N first signals based on the scan control signal.

12. The radar system according to claim 10, wherein the scanner is further configured to send angle data to the controller, wherein the angle data comprises a transmit angle at one or more transmit moments.

13. The radar system according to claim 1, wherein the receiving assembly comprises a telescope, a second optical fiber, and a second detector, wherein the telescope is configured to: receive the second signal, and couple the second signal to the second optical fiber;

the second optical fiber is configured to transmit the second signal to the second detector; and the second detector is configured to: convert the second signal into a second electrical signal, and send the second electrical signal to the controller.

14. The radar system according to claim 13, wherein the wavelengths of the N first signals are different, a quantity of second detectors is N, the receiving assembly further comprises a wavelength division multiplexer, wherein the second optical fiber is configured to transmit the second signal to the wavelength division multiplexer; and the wavelength division multiplexer is configured to: determine N signals with different wavelengths in the second signal, and transmit each of the N signals with different wavelengths to a corresponding second detector.

15. The radar system according to claim 1, wherein the controller is configured to:

when the second signal comprises the signals with N wavelengths and strength of each of the signals with N wavelengths is greater than a preset threshold, determine that the second signal is an echo signal.

16. The radar system according to claim 1, wherein the controller is configured to:

when the second signal comprises signals with N delays, a delay between peak moments of the signals with N delays meets a preset delay, and strength corresponding to each of peaks of the signals with N delays is greater than a preset threshold, determine that the second signal is an echo signal.

17. The radar system according to claim 1, wherein the controller is configured to:

when the second signal comprises the signals with N wavelengths, different delays exist between signals with different wavelengths, strength of each of the signals with N wavelengths is greater than a preset threshold, and a delay between peak moments of the signals with N wavelengths meets a preset delay, determine that the second signal is an echo signal.

18. A transmitting assembly in a radar system, wherein the transmitting assembly comprises:
- a laser and a signal processor; wherein
  - wherein the laser is configured to: generate a third signal, and send the third signal to the signal processor; and
  - the signal processor is configured to process the third signal to obtain N first signals, wherein characteristics of the N first signals are different, the characteristic comprises at least one of a wavelength or a delay, and N is an integer greater than 1;
- wherein the signal processor comprises an optical fiber coupler, a first optical fiber, and a signal separation assembly, and the first optical fiber is separately connected to the optical fiber coupler and the signal separation assembly; and
- wherein the transmitting assembly comprises at least one of a frequency multiplication crystal group or a delayer group, wherein the frequency multiplication crystal group is configured to convert a signal with a single wavelength into signals with N wavelengths, and the delayer group is configured to convert a signal with a single delay into signals with N delays, wherein the converting a signal with a single wavelength into signals with N wavelengths comprises converting the third signal into N fourth signals, and sending the N fourth signals to the delayer group, wherein wavelengths of the N fourth signals are different; and
- the optical fiber coupler is configured to couple the N fourth signals to the first optical fiber, the first optical fiber is configured to transmit the N fourth signals to the signal separation assembly, and the signal separation assembly is configured to: separate the N fourth signals, and send the N separated fourth signals to the delayer group.

19. The transmitting assembly according to claim 18, wherein the signal separation assembly comprises N−1 grating elements, the delayer group comprises N−1 delayers, and each grating element is configured to reflect a signal with one wavelength, wherein an $i^{th}$ grating element is configured to: reflect an $i^{th}$ fourth signal, and transmit the $i^{th}$ fourth signal to an $i^{th}$ delayer;

the $i^{th}$ delayer is configured to perform delay processing on the $i^{th}$ fourth signal to obtain an $i^{th}$ first signal, wherein i is a positive integer less than N; and an (N−1)th grating element is further configured to transmit an $N^{th}$ fourth signal to obtain an $N^{th}$ first signal.

20. The transmitting assembly according to claim 19, wherein the signal processor further comprises N−1 circulators, and before the transmitting the $i^{th}$ fourth signal to the $i^{th}$ delayer, the $i^{th}$ grating element is further configured to transmit the $i^{th}$ fourth signal to an $i^{th}$ circulator, and the $i^{th}$ circulator is configured to transmit the $i^{th}$ fourth signal in a preset direction; and correspondingly, the transmitting the $i^{th}$ fourth signal to the $i^{th}$ delayer comprises:

transmitting, to the $i^{th}$ delayer, the $i^{th}$ fourth signal that is output by the $i^{th}$ circulator.

21. The transmitting assembly according to claim 18, wherein the transmitting assembly further comprises a fiber collimator, a beam splitter, a first detector, and a scanner, wherein the fiber collimator is configured to transmit the N first signals to the beam splitter;

the beam splitter is configured to: transmit the N first signals to the scanner based on first energy, and transmit the N first signals to the first detector based on second energy, wherein a ratio of the first energy to the second energy is a preset ratio;

the scanner is configured to transmit the N received first signals; and the first detector is configured to: convert the N received first signals into a first electrical signal, and send the first electrical signal to a controller in the radar system.

* * * * *